United States Patent [19]
Tuttle et al.

[11] Patent Number: 6,108,151
[45] Date of Patent: *Aug. 22, 2000

[54] SAMPLED AMPLITUDE READ CHANNEL FOR READING USER DATA AND EMBEDDED SERVO DATA FROM A MAGNETIC MEDIUM

[75] Inventors: Tyson Tuttle; Diwakar Vishakhadatta, both of Austin; Jerrel P. Hein, Driftwood; David R. Welland, Austin, all of Tex.; David E. Reed, Westminster, Colo.; Richard T. Behrens, Louisville, Colo.; William G. Bliss, Thornton, Colo.; Paul M. Romano, Boulder, Colo.; Trent O. Dudley, Littleton, Colo.; Christopher P. Zook, Longmont, Colo.

[73] Assignee: Cirrus Logic, Inc., Fremont, Calif.

[*] Notice: This patent is subject to a terminal disclaimer.

[21] Appl. No.: 08/846,140

[22] Filed: Apr. 25, 1997

Related U.S. Application Data

[62] Division of application No. 08/440,515, May 12, 1995, Pat. No. 5,796,535.

[51] Int. Cl.⁷ ............ G11B 5/09; G11B 15/12; G11B 21/02
[52] U.S. Cl. ............ 360/51; 360/61; 360/75
[58] Field of Search ............ 360/46, 51, 61, 360/78.12, 77.04, 75, 69

[56] References Cited

U.S. PATENT DOCUMENTS

| | | | |
|---|---|---|---|
| 4,979,055 | 12/1990 | Squires et al. | 360/73.03 |
| 5,089,757 | 2/1992 | Wilson . | |
| 5,231,545 | 7/1993 | Gold . | |
| 5,258,933 | 11/1993 | Johnson et al. . | |
| 5,260,976 | 11/1993 | Dolivo et al. . | |
| 5,297,184 | 3/1994 | Behrens et al. . | |
| 5,311,178 | 5/1994 | Pan et al. . | |
| 5,329,251 | 7/1994 | Llewellyn . | |
| 5,341,249 | 8/1994 | Abbott et al. . | |
| 5,359,631 | 10/1994 | Behrens et al. . | |
| 5,384,671 | 1/1995 | Fisher . | |
| 5,406,427 | 4/1995 | Shimoda . | |
| 5,420,893 | 5/1995 | Ward . | |
| 5,424,881 | 6/1995 | Behrens et al. . | |
| 5,438,460 | 8/1995 | Coker et al. . | |
| 5,448,571 | 9/1995 | Hong et al. . | |
| 5,459,769 | 10/1995 | Ziperovich . | |
| 5,502,408 | 3/1996 | Scholz . | |
| 5,606,468 | 2/1997 | Kodama | 360/75 |
| 5,854,714 | 12/1998 | Reed et al. | 360/51 |

OTHER PUBLICATIONS

Edward A. Lee and David G. Messerschmitt, "Timing Recovery," *Digital Communications*, Chapter 15, pp. 560–585, Kuwer Academic Publishers, Boston, 1988.

Cideciyan et al., "A PRML System for Digital Magnetic Recording," *IEEE Journal on Selected Areas in Communications*, vol. 10, No. 1, Jan. 1992.

John Vanderkooy and Stanley P. Lipschitz, "Resolution Below the Least Significant Bit in Digital Systems with Dither," *J. Audio Eng. Soc.*, vol. 32, No. 3, Mar. 1984.

*Primary Examiner*—Paul Loomis
*Assistant Examiner*—Regina Y. Neal
*Attorney, Agent, or Firm*—Howard H. Sheerin; Dan Shifrin

[57] ABSTRACT

A sampled amplitude read channel is disclosed for reading data recorded on a disk storage medium by detecting an estimated binary sequence from a sequence of discrete time sample values generated by sampling pulses in an analog read signal from a read head positioned over the disk storage medium. The read channel comprises a sampling device, such as an analog-to-digital converter (A/D), for sampling the analog read signal to generate the discrete time sample values and for sampling at least one other auxillary analog input signal, such as a servo control signal. In this manner, performance characteristics of the read channel can be measured, such as the driving current applied to the servo control voice coil motor (VCM), without requiring additional hardware.

8 Claims, 20 Drawing Sheets

SAMPLED AMPLITUDE READ CHANNEL FOR READING USER DATA AND EMBEDDED SERVO DATA FROM A MAGNETIC MEDIUM

CROSS REFERENCE TO RELATED APPLICATIONS AND PATENTS

This application is a divisional of application Ser. No. 08/440,515, filed May 12, 1995, now U.S. Pat. No. 5,796,535.

This application is related to other co-pending U.S. patent applications, namely application Ser. No. 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control," and application Ser. No. 08/701,572 entitled "Improved Timing Recovery For Synchronous Partial Response Recording." This application is also related to several U.S. patents, namely U.S. Pat. No. 5,424,881 entitled "Synchronous Read Channel," U.S. Pat. No. 5,359,631 entitled "Timing Recovery Circuit for Synchronous Waveform Sampling," U.S. Pat. No. 5,291,499 entitled "Method and Apparatus for Reduced-Complexity Viterbi-Type Sequence Detectors," U.S. Pat. NO. 5,297,184 entitled "Gain Control Circuit for Synchronous Waveform Sampling," and U.S. Pat. No. 5,329,554 entitled "Digital Pulse Detector." All of the above-named patent applications and patents are assigned to the same entity, and all are incorporated herein by reference.

FIELD OF INVENTION

The present invention relates to the control of magnetic storage systems for digital computers, and particularly, to discrete time circuitry integrated into a sampled amplitude read channel for synchronous detection of user data and embedded servo data.

BACKGROUND OF THE INVENTION

In magnetic disk storage systems for computers, digital data serves to modulate the current in a read/write head coil so that a sequence of corresponding magnetic flux transitions are written onto a magnetic medium in concentric tracks. To read this recorded data, the read/write head passes over the magnetic medium and transduces the magnetic transitions into pulses in an analog signal that alternate in polarity. These pulses are then decoded by read channel circuitry to reproduce the digital data.

Decoding the pulses into a digital sequence can be performed by a simple peak detector in a conventional analog read channel or, as in more recent designs, by a discrete time sequence detector in a sampled amplitude read channel. Discrete time sequence detectors are preferred over simple analog pulse detectors because they compensate for intersymbol interference (ISI) and are less susceptible to noise. As a result, discrete time sequence detectors increase the capacity and reliability of the storage system.

There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In conventional peak detection schemes, analog circuitry, responsive to threshold crossing or derivative information, detects peaks in the continuous time analog signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

As the pulses are packed closer together on the concentric data tracks in the effort to increase data density, detection errors can also occur due to intersymbol interference, a distortion in the read signal caused by closely spaced overlapping pulses. This interference can cause a peak to shift out of its bit cell, or its magnitude to decrease, resulting in a detection error. The ISI effect is reduced by decreasing the data density or by employing an encoding scheme to ensure that a minimum number of "0" bits occur between "1" bits. For example, a (d,k) run length limited (RLL) code constrains to d the minimum number of "0" bits between "1" bits, and to k the maximum number of consecutive "0" bits. A typical RLL code is a (1,7) ⅔ rate code which encodes 8 bit data words into 12 bit codewords to satisfy the (1,7) constraint.

Sampled amplitude detection, such as partial response (PR) with Viterbi detection, allows for increased data density by compensating for intersymbol interference an increasing channel noise immunity. Unlike conventional peak detection systems, sampled amplitude recording detects digital data by interpreting, at discrete time instances, the actual value of the pulse data. The analog pulses are sampled at the baud rate (code bit rate) and the digital data is detected from these discrete time sample values. A discrete time sequence detector, such as a Viterbi detector, interprets the discrete time sample values in context to determine a most likely sequence for the data. In this manner, the effect of ISI can be taken into account during the detection process, thereby decreasing the probability of a detection error. This increases the effective signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp.921–934, Sept. 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp.38–56; and Wood et al, "Viterbi Detection of Class IV Partial Response on a Magnetic Recording Channel", *IEEE Trans. Commun.*, Vol. Com-34, No. 5, pp. 454–461, May 1986; and Coker Et al, "Implementation of PRML in a Rigid Disk Drive", *IEEE Trans. on Magnetics*, Vol. 27, No. 6, Nov. 1991; and Carley et al, "Adaptive Continous-Time Equalization Followed By FDTS/DF Sequence Detection", *Digest of The Magnetic Recording*

Conference, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, Sept. 1994; and Abbott et al, "Timing Recovery For Adaptive Decision Feedback Equalization of The Magnetic Storage Channel", *Globecom'90 IEEE Global Telecommunications Conference* 1990, San Diego, Calif., Nov. 1990, pp.1794–1799; and Abbott et al, "Performance of Digital Magnetic Recording with Equalization and Offtrack Interference", *IEEE Transactions on Magnetics*, Vol. 27, No. 1, Jan. 1991; and Cioffi et al, "Adaptive Equalization in Magnetic-Disk Storage Channels", *IEEE Communication Magazine*, Feb. 1990; and Roger Wood, "Enhanced Decision Feedback Equalization", *Intermag'90*.

Similar to conventional peak detection systems, sampled amplitude detection requires timing recovery in order to correctly extract the digital sequence. Rather than process the continuous signal to align peaks to the center of bit cell periods, as in peak detection systems, sampled amplitude systems synchronize the sampling of the pulses to the baud rate. That is, timing recovery adjusts the sampling clock in order to minimize the error between the signal sample values and estimated sample values. A pulse detector or slicer determines the estimated sample values from the read signal samples. Even in the presence of ISI the sample values can be estimated and, together with the signal sample values, used to synchronize the sampling of the analog pulses in a decision-directed feedback system.

The decision-directed feedback system is normally implemented using a phase-locked-loop (PLL) circuit comprising a phase detector for generating a phase error based on the difference between the estimated samples and the read signal samples. A loop filter filters the phase error, and the filtered phase error operates to adjust the sampling clock which is typically the output of a variable frequency oscillator (VFO) with the filtered phase error as the control input. The output of the VFO controls the sampling clock of a sampling device such as an analog-to-digital (A/D) converter.

It is helpful to first lock the PLL to a reference or nominal sampling frequency so that the desired sampling frequency, with respect to the analog pulses representing the digital data, can be acquired and tracked more efficiently. The nominal sampling frequency is the baud rate, the rate that data was written onto the medium. Therefore, one method to lock-to-reference is to generate a sinusoidal signal relative to the write clock and inject this signal into the PLL. Once locked to the reference frequency (write frequency), the PLL input switches from the write clock to the signal from the read head in order to synchronize the sampling of the waveform in response to a sinusoidal acquisition preamble recorded on the medium.

The timing recovery loop filter controls the dynamics of the phase-lock-loop. Accordingly, the loop filter coefficients are adjusted to achieve a desired transient response and tracking quality. For good tracking quality, the loop bandwidth should be narrow so that phase noise and gain variance are attenuated. During acquisition, the loop bandwidth should be as wide as possible without being unstable to achieve a fast transient response in order to minimize the length of the acquisition preamble.

Sampled amplitude read channels also employ a decision-directed feedback system to control the gain of the analog read signal in order to minimize a gain error between the signal sample values and estimated sample values. The gain error is filtered and applied to the control input of a variable gain amplifier (VGA) in order to adjust the magnitude of the read signal toward the desired partial response.

A DC offset in the analog read signal can adversely affect the performance of the automatic gain control and timing recovery circuitry. A decimation DC offset circuit can compensate for the undesirable effects by computing the DC offset from the read signal sample values and subtracting it from the analog read signal before sampling (see, e.g., the above referenced co-pending U.S. patent application Ser. No. 08/341,251). Similar to the gain control and timing recovery loops, the DC offset loop comprises a filter for filtering the computed DC offset.

Also relevant to the present invention is the servo control system for positioning the read/write head over a selected track in order to read and write information. In disk drives utilizing either analog or sampled amplitude read channels, the read/write head is normally mounted on an actuator arm which is positioned by means of a voice coil motor (VCM). The VCM moves the head and actuator arm assembly across the disk surface at a very high speed to perform seek operations in which the head is positioned over a selected data track. The VCM also maintains the head over the selected track while reading or writing information as successive portions of the track pass under the head. A servo system controller provides the head positioning necessary for reading and writing information in response to requests from a computer to which the disk drive is connected.

In embedded servo disk drives, servo fields are normally recorded on the disk as radial spokes 17 that "split" the data sectors 15 as shown in FIG. 2A. Each servo spoke 17 is referred to as a "wedge" of servo data comprising servo control information and servo data. The servo control information typically includes a preamble 5 to allow gain control to acquire to the read signal before reading the servo data, and a servo synch mark 7 to signal the beginning of the servo data 3 (see FIG. 2B). If the servo data is detected synchronously, then the preamble is also used to synchronize timing recovery to the read signal before reading the servo data. The servo data may also comprise a track number code which is a Gray coded integer value of the track currently spanned by the read/write head, a head number identifying the current platter in a multi-disk system, and a wedge number identifying the current servo wedge. The servo data may also optionally comprise a servo address mark for asynchronous identification of the wedge when the disk drive spins up initially.

The embedded servo field also typically includes off-track burst information physically positioned at precise intervals and locations with respect to the various track centerlines to provide the servo system controller with information relative to the fractional track-to-track displacement of the head with respect to a selected track centerline. The servo controller uses the servo burst information to keep the read head aligned over the centerline of the selected track while data is written or read from the medium.

Similar to the servo data sectors, the user data sectors 15 also comprise an acquisition preamble 68 and a sync mark 70 to signal the beginning of a user data field 72 as shown in FIG. 2B.

Zoned recording is a technique known in the art for increasing the storage density by recording the user data at different rates in predefined zones between the inner diameter (ID) and outer diameter (OD) tracks. The data rate can be increased at the outer diameter tracks due to the increase in circumferential recording area and the decrease in intersymbol interference. This allows more data to be stored in the outer diameter tracks as is illustrated in FIG. 2A where the disk is partitioned into an outer zone 11 comprising fourteen data sectors per track, and an inner zone 13 comprising seven data sectors per track. In practice, the disk may actually be partitioned into several zones at varying data rates.

When using synchronous detection to read the servo fields, the read channel operates in the same manner as if it were reading user data as described above. That is, the gain and DC offset circuitry adjust the amplitude and offset of the analog read signal, and timing recovery locks to a reference frequency, acquires the servo preamble, and synchronizes the sampling of the servo data. In most disk drive storage systems, however, the embedded servo fields are not recorded at the same rate as the user data. There is, therefore, a deficiency in the operation of read channels that cannot re-program the gain control, timing recovery, and DC offset circuits when the read channel transitions between reading user data and servo data.

Other drawbacks overcome by the present invention include: the inability to pipeline reads to reduce the gap between sectors; the inability to use the read channel sampling device for sampling other analog signals generated by the storage system such as servo control signals; the inability to use information provided in the preamble field to optimize operation of the sync mark detector; the inability to detect the user data sync mark and the servo data sync mark using the same sync mark detector; and the inability to adjust the response of the gain control loop when searching for the servo address mark.

What is needed is a robust technique for re-programming the gain control, DC offset control, and timing recovery control circuits when the read channel transitions between reading user data and embedded servo data. Another object is to pipeline reads to minimize the gap on the medium between adjacent user data sectors and the gap between user data and servo data sectors. A further object is to use the read channel sampling device for sampling auxiliary analog signals generated by the storage system. Another object is to use the same sync mark detector for detecting the user data sync mark and the servo data sync mark. Yet another object is to enable operation of a sync mark detector at a clock interval selected in relation to the preamble. A further object is to adjust the frequency response of the gain control loop when searching for the servo address mark.

SUMMARY OF THE INVENTION

In a sampled amplitude read channel for reading user data and embedded servo data in a magnetic disk storage device, a plurality of components including a timing recovery circuit, an automatic gain control circuit, and a DC offset circuit comprise at least one filter programmed from a set of "shadow" registers corresponding to whether the read channel is in a user data or servo data mode. The filter coefficients and accumulation paths are updated from the shadow registers when the read channel transitions between reading user data and embedded servo data. The magnetic disk is partitioned into several zones, and the filters are initialized with calibrated values when the read/write head passes into a new zone.

The timing recovery circuit comprises a phase-locked-loop for synchronizing the sampling of an analog read signal generated from the read head passing over the magnetic medium. The timing recovery PLL includes a variable frequency oscillator (VFO) comprising an output for controlling the sampling frequency of a sampling device; a first control input for receiving a channel data rate (CDR) command; and a second control input for receiving a center frequency command. The CDR command is programmably set from a user/servo shadow register according to the zone where the selected track is located.

The PLL center frequency command comprises a course setting, a bias setting and a fine setting. The course setting is generated either by a user data synthesizer or a servo data synthesizer depending on the user/servo mode of the read channel. The bias setting is programmably set from a user/servo shadow register and compensates for differences in fabrication between the synthesizer VFOs and the timing recovery VFO. The fine setting is generated by a discrete time phase error detector which measures a difference between the sampling phase/frequency and the baud rate.

Before acquiring the acquisition preamble preceding the user or servo data, the timing recovery PLL is locked to the output of the user or servo synthesizer depending on the user/servo mode. This is accomplished by injecting, into the read channel, the analog output signal from the respective synthesizer so that timing recovery locks onto the appropriate frequency.

In order to reduce the gap between adjacent user data sectors and the gap between user data and servo data sectors, operation of the read channel is pipelined by resetting the gain, timing recovery, and DC offset circuits before the discrete time equalizing filter and sequence detector have finished processing the samples for the current sector. This allows the read channel to begin acquiring the preamble of a next sector (user or servo data) concurrent with processing the end of the previous sector, thereby decreasing the physical gap on the medium between sectors.

The read channel also comprises a programmable sync mark detector for detecting both the user data and servo data sync marks in order to frame the operation of respective RLL user data and servo data decoders. The sync mark detector is enabled by the timing recovery circuit at a sample interval predetermined in relation to the preamble field.

When the disk drive initially spins up, an asynchronous servo address mark detector determines the location of the servo wedges with respect to the read head. To facilitate asynchronous detection, the gain control circuit computes a gain error according to a predetermined set point and the maximum absolute value over a programmable block length.

The above and other advantages of the present invention will be better understood with reference to the accompanying drawings together with the following detailed description of the preferred embodiments.

DETAILED DESCRIPTION OF THE PREFERRED EMBODIMENT

Conventional Sampled Amplitude Read Channel

Figure 1:
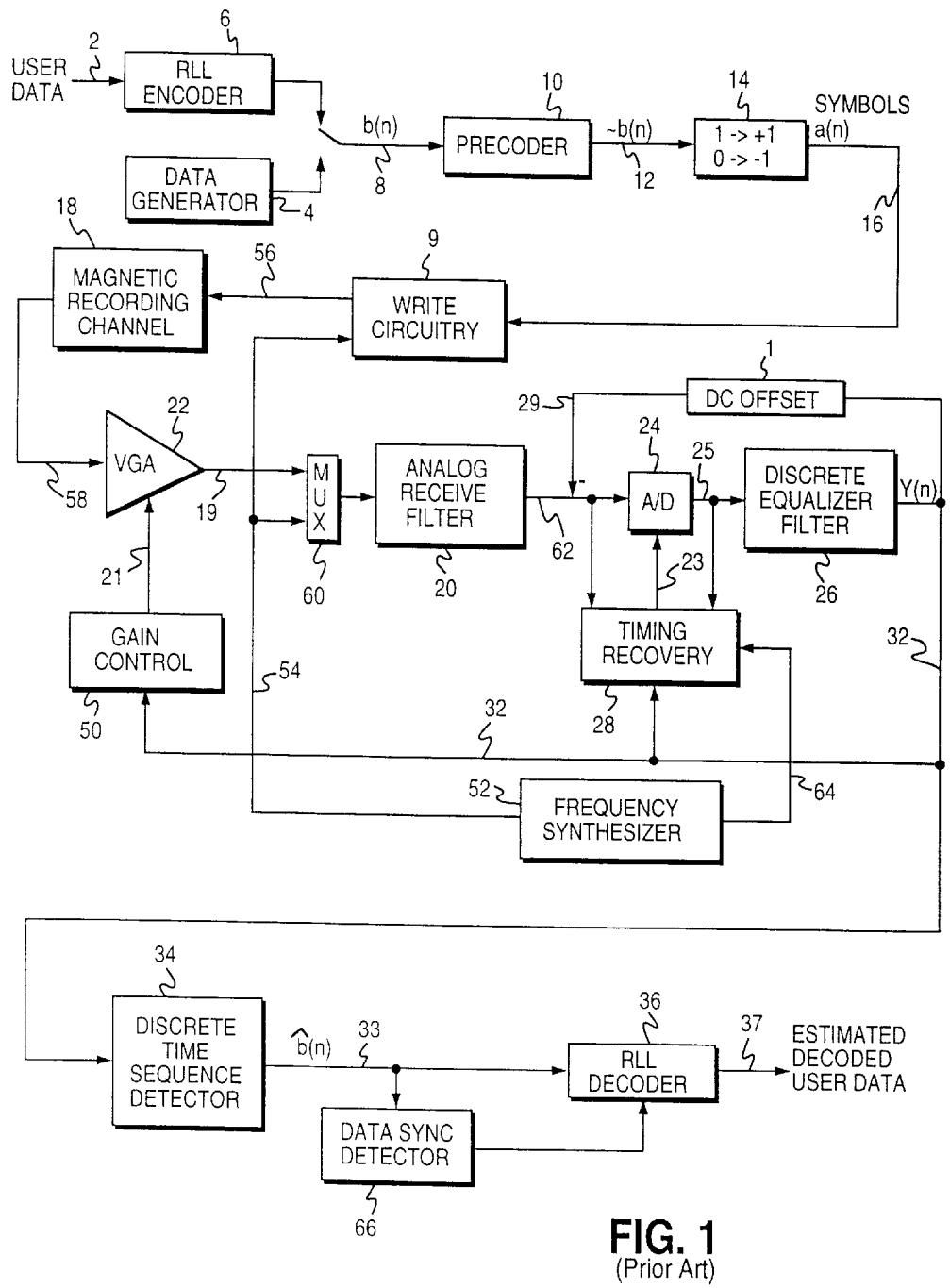
FIG. 1 is a block diagram of a conventional sampled amplitude recording channel.

FIG. 1 is a detailed block diagram of a conventional sampled amplitude read channel. During a write operation, either user data 2 or preamble data from a data generator 4 (for example 2T preamble data) is written onto the media. An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizing filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. Write circuitry 9, responsive to the symbols a(n) 16, modulates the current in the recording head coil at the baud rate 1/T to record the binary sequence onto the media. A frequency synthesizer 52 provides a baud rate write clock 54 to the write circuitry 9.

When reading the recorded binary sequence from the media, timing recovery 28 first locks to the write frequency by selecting, as the input to the read channel, the write clock 54 through a multiplexor 60. Once locked to the write frequency, the multiplexor 60 selects the signal 19 from the read head as the input to the read channel in order to acquire the acquisition preamble. A variable gain amplifier 22 adjusts the amplitude of the analog read signal 58, and an analog filter 20 provides initial equalization toward the desired response. A sampling device 24 samples the analog read signal 62 from the analog filter 20, and a discrete time filter 26 provides further equalization of the sample values 25 toward the desired response. In partial response recording, for example, the desired response is often selected from Table 1. A DC offset circuit 1 responsive to the equalized sample values 32 computes and subtracts the DC offset 29 from the analog read signal 62.

The equalized sample values 32 are applied to decision directed gain control 50 and timing recovery 28 for adjusting the amplitude of the read signal 58 and the frequency and phase of the sampling device 24, respectively. Timing recovery adjusts the frequency of sampling device 24 over line 23 in order to synchronize the equalized samples 32 to the baud rate. Frequency synthesizer 52 provides a coarse center frequency setting to the timing recovery circuit 28 over line 64 in order to center the timing recovery frequency over temperature, voltage, and process variations. Gain control 50 adjusts the gain of variable gain amplifier 22 over line 21. The equalized samples Y(n) 32 are sent to a discrete time sequence detector 34, such as a maximum likelihood (ML) Viterbi sequence detector, to detect an estimated binary sequence ^b(n) 33. An RLL decoder 36 decodes the estimated binary sequence ^b(n) 33 into estimated user data 37. A data sync mark detector 66 detects the sync mark 70 (shown in FIG. 2B) in the data sector 15 in order to frame the operation of the RLL decoder 36 and signal the beginning of user data 72. In the absence of errors, the estimated binary sequence ^b(n) 33 is equal to the recorded binary sequence b(n) 8, and the decoded user data 37 is equal to the recorded user data 2.

Improved Sampled Amplitude Read Channel

Figure 3:
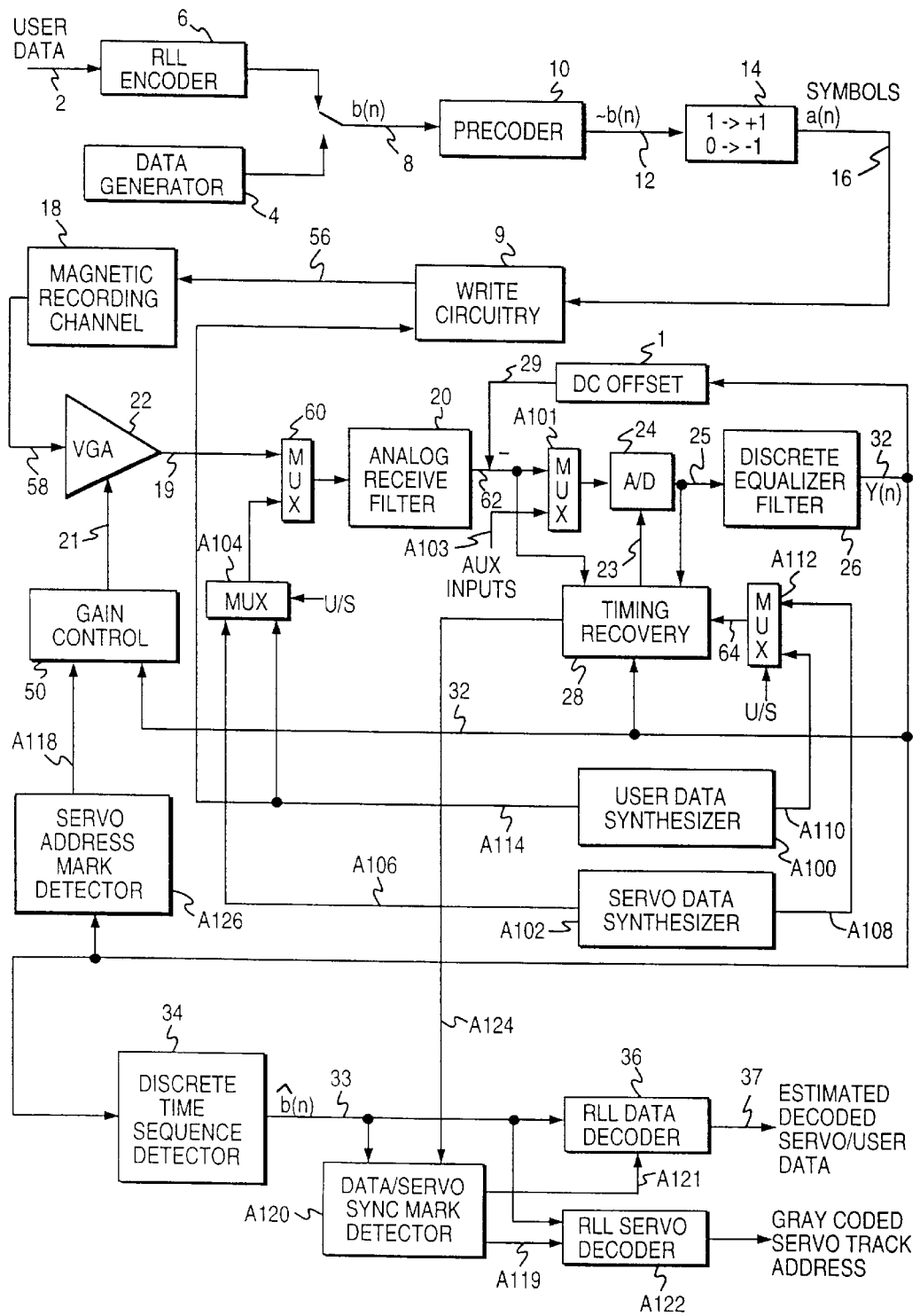
FIG. 3 is a block diagram of the sampled amplitude read channel of the present invention comprising automatic gain control, DC offset control, timing recovery, a first and second synthesizer for processing user and servo data respectively, an asynchronous servo address mark detector, and a sync mark detector for detecting user data and servo data sync marks.

FIG. 3 is a block diagram of the improved sampled amplitude read channel of the present invention comprised of a user data frequency synthesizer A100 and a servo data frequency synthesizer A102. When reading user data, a control line U/S selects the output A114 of the user data synthesizer A100 as the lock to reference frequency through a multiplexor A104. The control line U/S also selects the coarse center frequency setting A110 through a multiplexor A112 as the timing recovery control signal 64. When the read channel switches into servo data mode in order to read a servo wedge, the control line U/S selects the output A106 of the servo data synthesizer A102 as the lock to reference frequency through multiplexor A104. The control line U/S also selects the coarse center frequency setting A108 from the servo data synthesizer A102 through multiplexor A112 as the timing recovery control signal 64.

The read channel further comprises an asynchronous servo address mark detector A126 for generating a control signal A118 indicating when the servo address mark has been detected. The servo address mark detector A126 switches operation of the gain control circuit over line A118 to compensate for the unpredictable amplitude fluctuations caused by the inter-track head position and the wide range of user to servo data densities.

A data/servo sync detector A120, responsive to the detected binary sequence 33 from the sequence detector 34, detects both user data and servo data sync marks and generates framing signals (A121,A119) to frame operation of a user data RLL decoder 36 and a servo data RLL decoder A122, respectively. The sync detector A120 is also responsive to a control signal A124 from the timing recovery circuit 28 to aid in the sync detection process.

The read channel further comprises auxiliary analog inputs for sampling other analog signals generated within the disk drive such as the driving current for a Voice Coil Motor in a servo system, or the output of a temperature sensor. A multiplexor A101 selects, as the input to sampling device 24, the analog read signal 62 from the analog receive filter 20 or one of a plurality of auxiliary input signals A103. When an auxiliary input is selected for sampling, the output 25 of the sampling device 24 is stored into registers for subsequent processing by a microcontroller such as a servo controller.

Pipelined Reads

Before the read channel can process a new user or servo data sector, components such as the filters in timing recovery, gain control, and DC offset control must be reconfigured to acquire the preamble of the new sector. During this reconfiguration process, the magnetic disk continues to spin under the read head creating a physical gap on the medium between the end of a current sector and the beginning of a new sector. In order to reduce the gap between sectors, operation of the read channel is pipelined by reconfiguring the gain control 50, timing recovery 28, and DC offset 1 circuits before the discrete time equalizing filter 26 and sequence detector 34 have finished processing the samples for the current sector. This allows the read channel to begin acquiring the preamble (68,5) of a next sector (user or servo data) concurrent with processing the end of the previous sector, thereby decreasing the physical gap on the medium between sectors.

Dual Synthesizers

Figure 4:
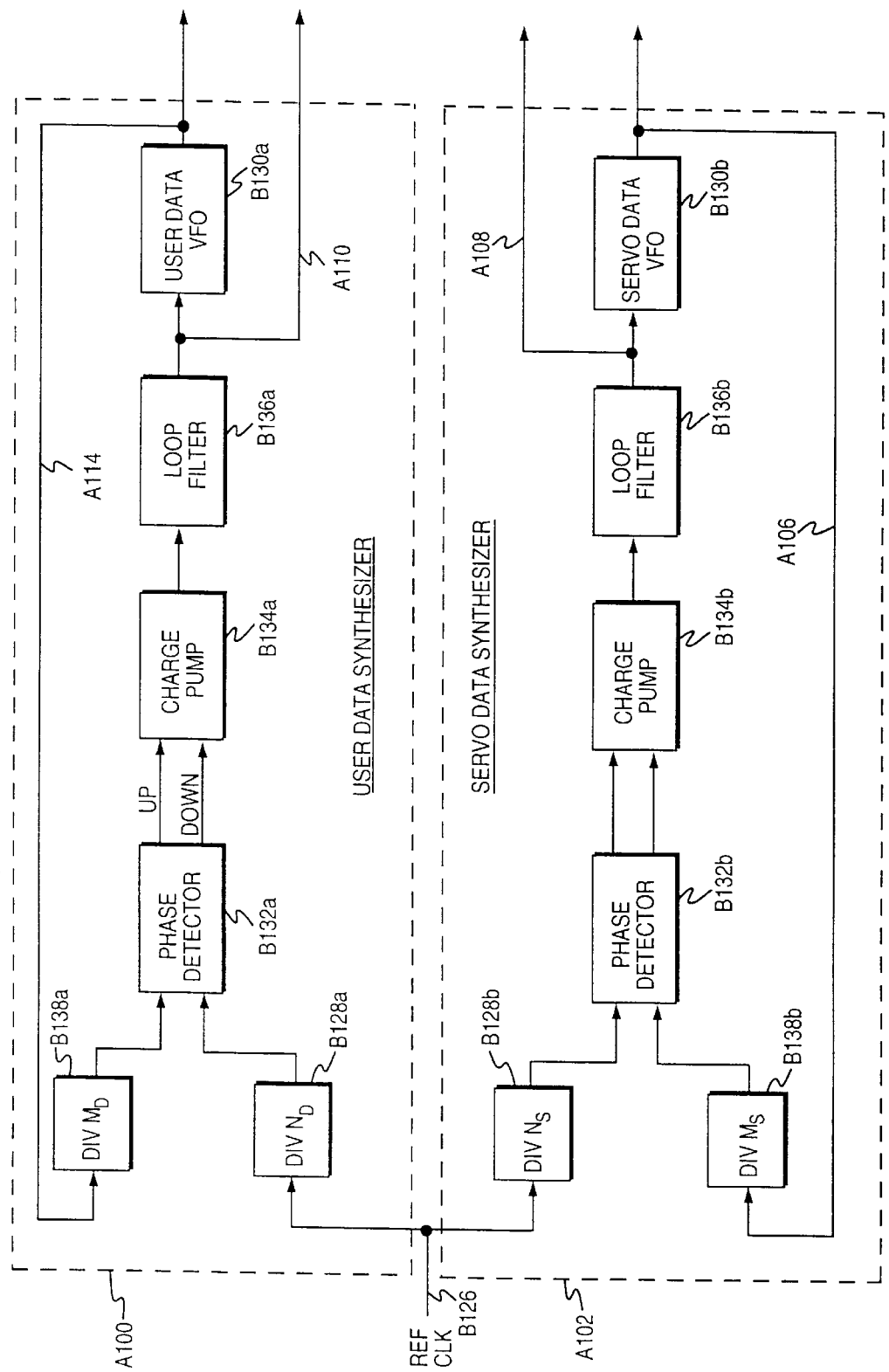
FIG. 4 shows an implementation of the user data and servo data synthesizers.

FIG. 4 shows a block diagram of the user data synthesizer A100 and the servo data synthesizer A102. Each synthesizer comprises a VFO (B130a,B130b) that is part of a phase locked loop having a reference frequency input B126 divided by a DIV Nx circuit (B128a,B128b). Phase detectors (B132a,B132b) generate a respective phase error between the output of the DIV Nx circuits (B128a,B128b) and the output of the VFOs (B130a,B130b) divided by a DIV Mx circuit (B138a,B138b). The phase error adjusts the output of respective charge pumps (B134a,B134b), the outputs of which are filtered by filters (B136a,B136b) and applied as the control signals (A110,A108) to the VFOs (B130a,B130b). The respective VFO outputs (A114,A106) are characterized by the equation: REF_CLK.(Mx/Nx).

The output A114 of the user data synthesizer A100 is the write clock applied to the write circuitry 9 and also the timing recovery 28 lock to reference frequency when reading user data. The output A106 of the servo data synthesizer A102 is the timing recovery 28 lock to reference frequency when reading servo data. The synthesizer VFO control signals (A110,A108) are the coarse center frequency settings during user data and servo data modes, respectively, for the timing recovery VFO B164 of FIG. 7. In this manner, by matching the synthesizer VFOs (B130a,B130b) to the timing recovery VFO B164, the timing recovery circuit 28 operates independent of changes in temperature and voltage. Additionally, switching between a user and servo data synthesizer compensates for the inherently slow transient response of a single synthesizer.

Shadow Registers

The read channel gain control 50, timing recovery 28 and DC offset circuit 1, each comprise a filter for filtering their respective control signals. In the present invention, the coefficients and accumulation paths of these filters are updated when the read channel transitions between reading user data and servo data. This is necessary because the servo data is recorded at a different rate than the user data across the zones. Each filter coefficient and accumulation path has a pair of registers—a first register to hold the value for user data mode, and a second register to hold a value for servo data mode. The U/S (user/servo) control signal selects the appropriate shadow register according to the current mode.

Figure 5:
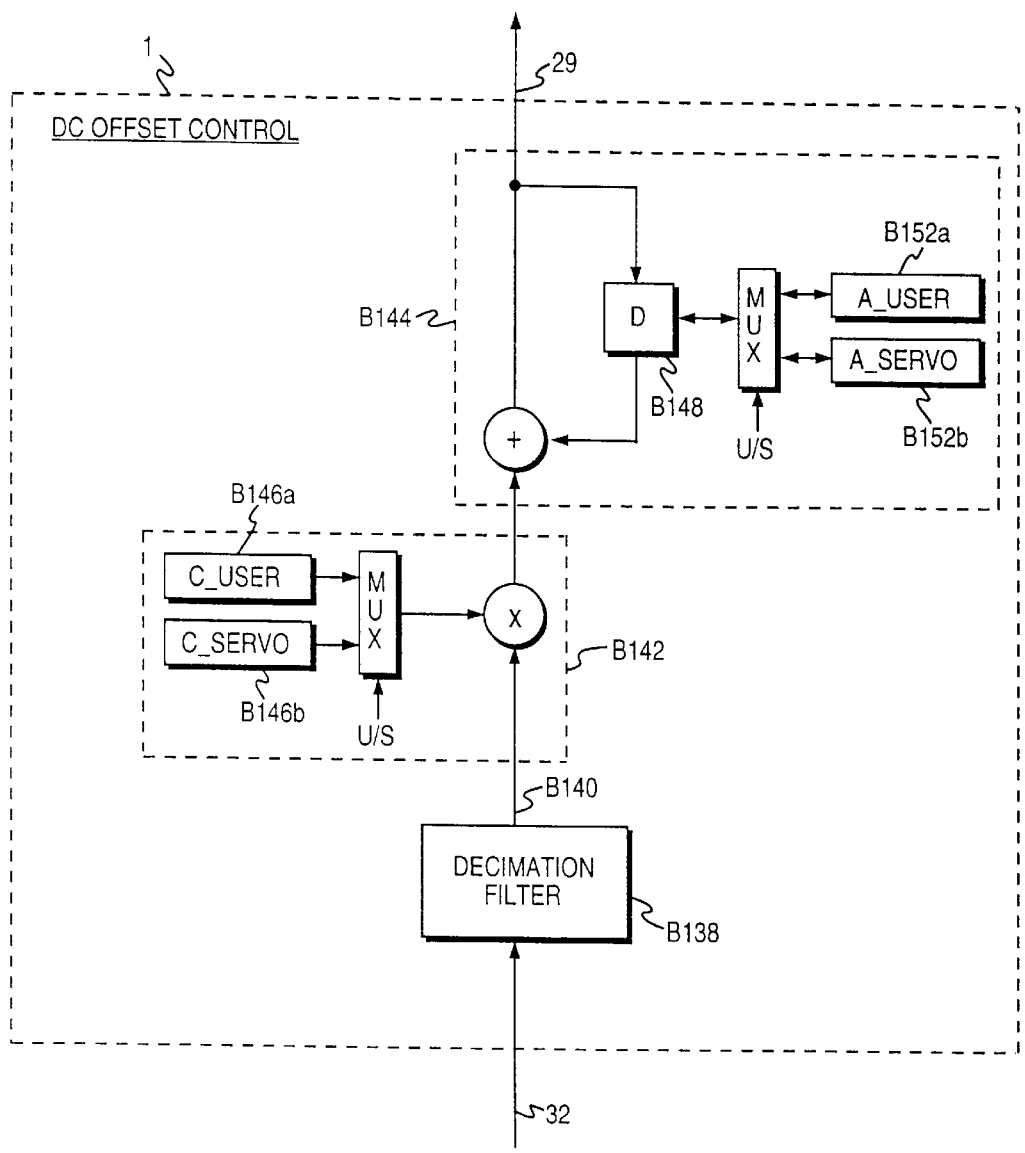
FIG. 5 shows the DC offset control circuit comprising a filter having a programmable gain and accumulation path which are updated when the read channel transitions between reading user data and servo data.

The DC offset circuit 1, shown in FIG. 5, comprises a decimation filter B138 for filtering the equalized sample values 32 to compute the DC offset in the read signal. Operation of the decimation filter B138 is described in the above referenced co-pending U.S. patent application Ser. No. 08/341,251. Basically, the DC offset is computed by adding the sample values of two consecutive opposite polarity pulses. The DC offset is applied over line B140 to an integrating filter comprised of a multiplying coefficient B142 and an integrating accumulation path B144. When the read channel is reading user data, the U/S control signal selects a C_USER B146a coefficient input to the multiplier B142. When the read channel encounters a servo wedge, the U/S control signal selects a C_SERVO B146b coefficient, saves the value stored in a delay register B148 of the accumulation path B144 into an A_USER register B152a, and loads the value saved in an A_SERVO register B152b into the delay register B148 of the accumulation path B144.

After processing the servo wedge, the filter's multiplier B142 and accumulation path B144 are updated for reading user data in a similar manner. As a result, the filter's frequency response is dynamically updated and the transient response between reading user data and servo data is minimized.

Figure 6:
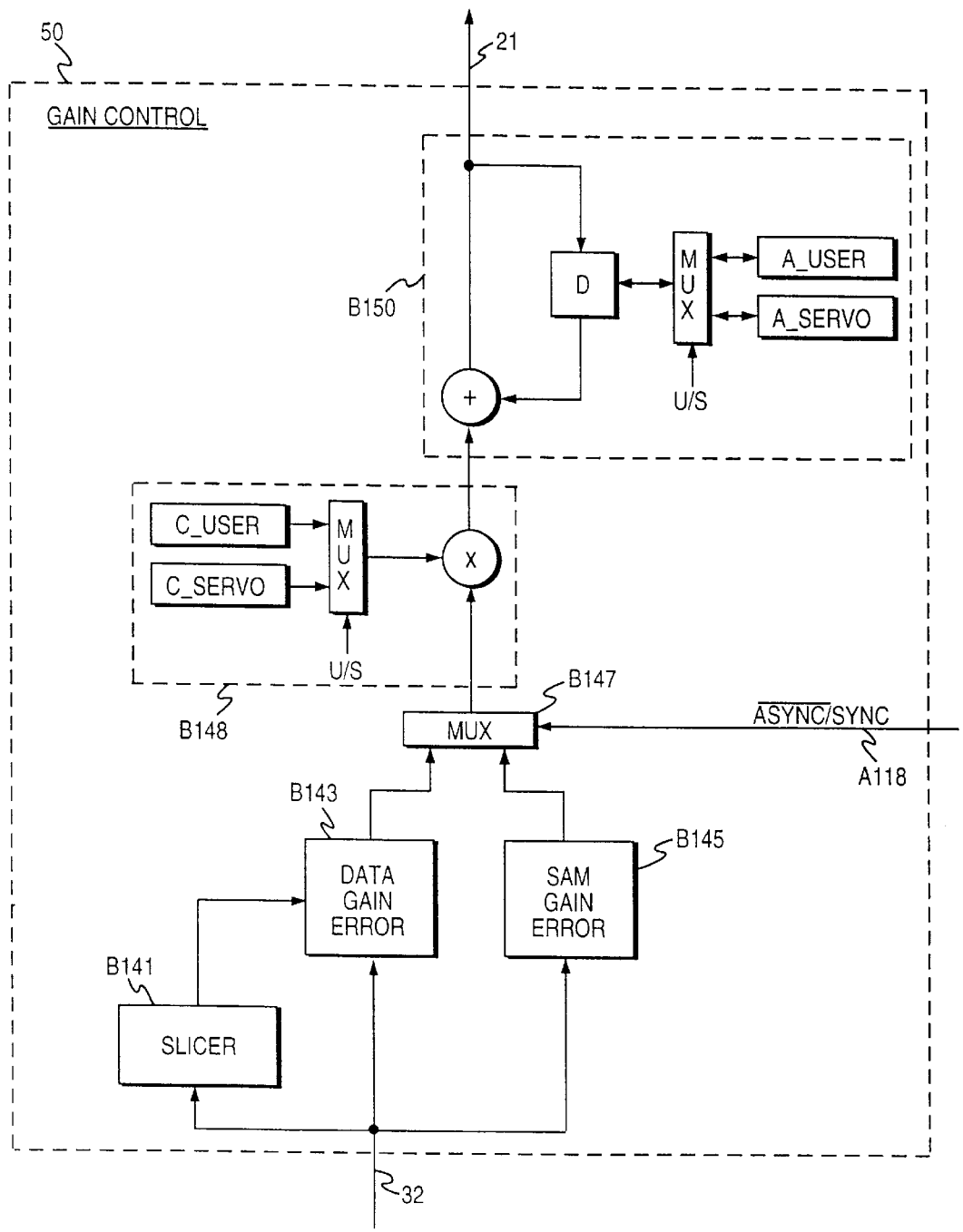
FIG. 6 shows the gain control circuit comprising a filter having a programmable gain and accumulation path which are updated when the read channel transitions between reading user data and servo data.

The gain control circuit 50, shown in FIG. 6, also comprises an integrating filter having a multiplier B148 and an accumulation path B150 which are updated between user data and servo data modes in the same manner as the integrating filter in the DC offset circuit 1. Other gain control components shown in FIG. 5 include: a slicer B141 for fast (but less accurate) sample value estimation according to Table B2; a data gain error detector B143 for computing the gain error when reading user and servo data; a servo address mark (SAM) gain error detector B145 for computing the gain error when searching for the SAM during spin up; and a multiplexor B147 for selecting between the data and SAM gain error detectors as controlled by the servo address mark detector A126 of FIG. A3 over line A118.

Figure 7:
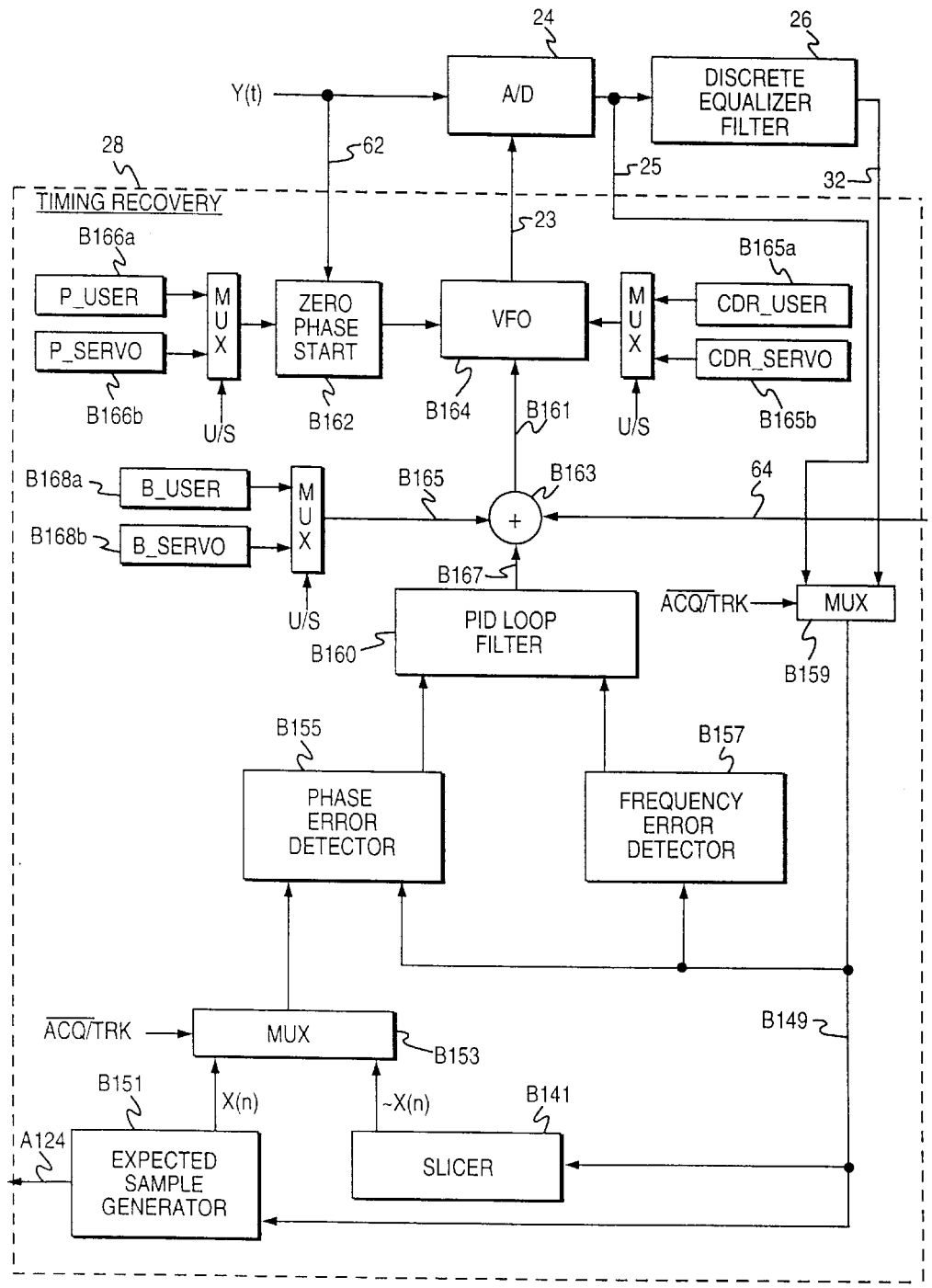
FIG. 7 is a block diagram of the timing recovery circuit comprising a VFO for controlling the sampling frequency wherein the VFO is responsive to a zero phase start signal and a frequency control signal generated by summing a course center frequency setting, a fine center frequency setting and a bias setting.
Figure 8:
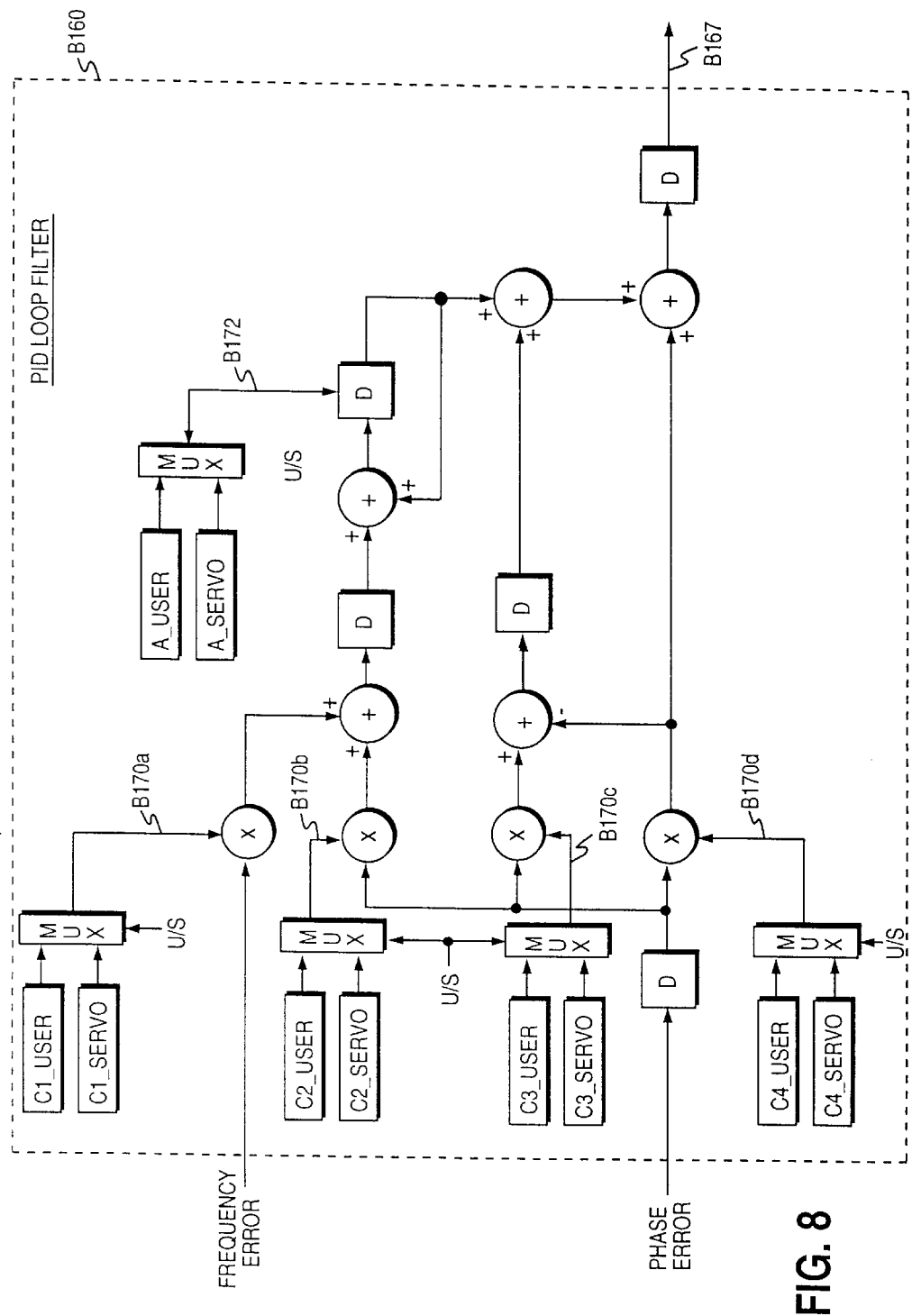
FIG. 8 is a detailed diagram of a preferred embodiment for the timing recovery PID filter where the filter's coefficients and accumulation path are updated between user and servo data modes.

Similar to DC offset 1 and gain control 50, the timing recovery circuit 28, shown in FIG. 7, comprises a filter B160 for filtering the timing recovery control signal. The timing recovery filter B160 is a PID filter shown in FIG. 8 that has four coefficient multiplying paths (B170a, B170b, B170c, B170d) and an accumulation path B172 that are updated in the same manner as the DC offset 1 and gain control 50 circuits. Operation of the PID filter B160 is described in the above referenced co-pending U.S. patent application Ser. No. 08/341,251.

The timing recovery circuit 28 of FIG. 7 also comprises a zero phase start circuit B162 for delaying operation of the VFO B164 between lock to reference and the start of acquisition until a zero crossing is detected, thereby minimizing the initial phase error between the sampling rate and baud rate of the acquisition preamble. Phase delay shadow registers (B166a,B166b) compensate for delays in the zero phase start circuit B162 and delays in the data path after the analog receive filter 20.

The operating frequency of the timing recovery VFO B164 is adjusted by a control signal B161 at the output of adder B163. The control signal B161 is the sum of three signals: a bias value B165 that compensates for process differences between the synthesizer VFOs (B130a,B130b) and the timing recovery VFO B164, a fine center value B167 that is the filtered phase error output from the PID filter B160, and a coarse center value 64 output from the user or servo synthesizer (A100, A102) depending on the user/servo mode. Shadow registers (B165a,B165b) control the operating range of the timing recovery VFO B164 corresponding to the channel data rate (CDR) of the current zone.

The U/S control signal selects shadow registers (B165a, B166a,B168a) when reading user data and registers (B165b, B166b,B168b) when reading embedded servo data.

Other timing recovery components shown in FIG. 7 include: an expected sample value generator B151 for generating expected samples X(n) during acquisition mode; a slicer B141 for generating estimated samples ~X(n) during tracking mode; a multiplexor B153 for selecting between the output of the expected sample generator B151 and the slicer B141; a phase error detector B155 for generating a phase error during acquisition and tracking; a frequency error detector B157 for generating a frequency error during lock to reference; and a multiplexor B159 for supplying the unequalized sample values 25 during acquisition and the equalized sample values 32 during tracking over line B149.

The initial values for the shadow registers are determined through a calibration procedure which measures the optimum settings for each zone. When the read head passes into a new zone, the calibrated settings corresponding to the new zone are loaded into the shadow registers.

Data/Servo Sync Detector

After acquiring the preamble (68,5) (shown in FIG. 2B), a data/servo sync mark detector A120 of FIG. 3 searches for the sync mark (70,7) which demarks the beginning of the user or servo data fields. When the sync mark (70,7) is detected, the data/servo sync detector A120 enables operation of the RLL data decoder 36 or the RLL servo decoder A122 in order to frame the user or servo data fields.

The data/servo sync mark detector A120 detects the sync mark (70,7) by correlating a target sync mark with the estimated bit sequence b(n) 33 from the discrete time sequence detector. In order to minimize the probability of early misdetection, the sync mark (70,7) is selected to have a minimum correlation with the sync mark (70,7) concatenated with the preamble (68,5). It is also selected for maximum probability of correct detection when the sync mark is corrupted by errors due to noise. This is accomplished with a computer search program which searches for an appropriate sync mark by correlating a target sync mark with shifted values of the target sync mark appended to the preamble. The search program also correlates the target sync mark with corrupted versions of the sync mark appended to the preamble.

Figure 9:
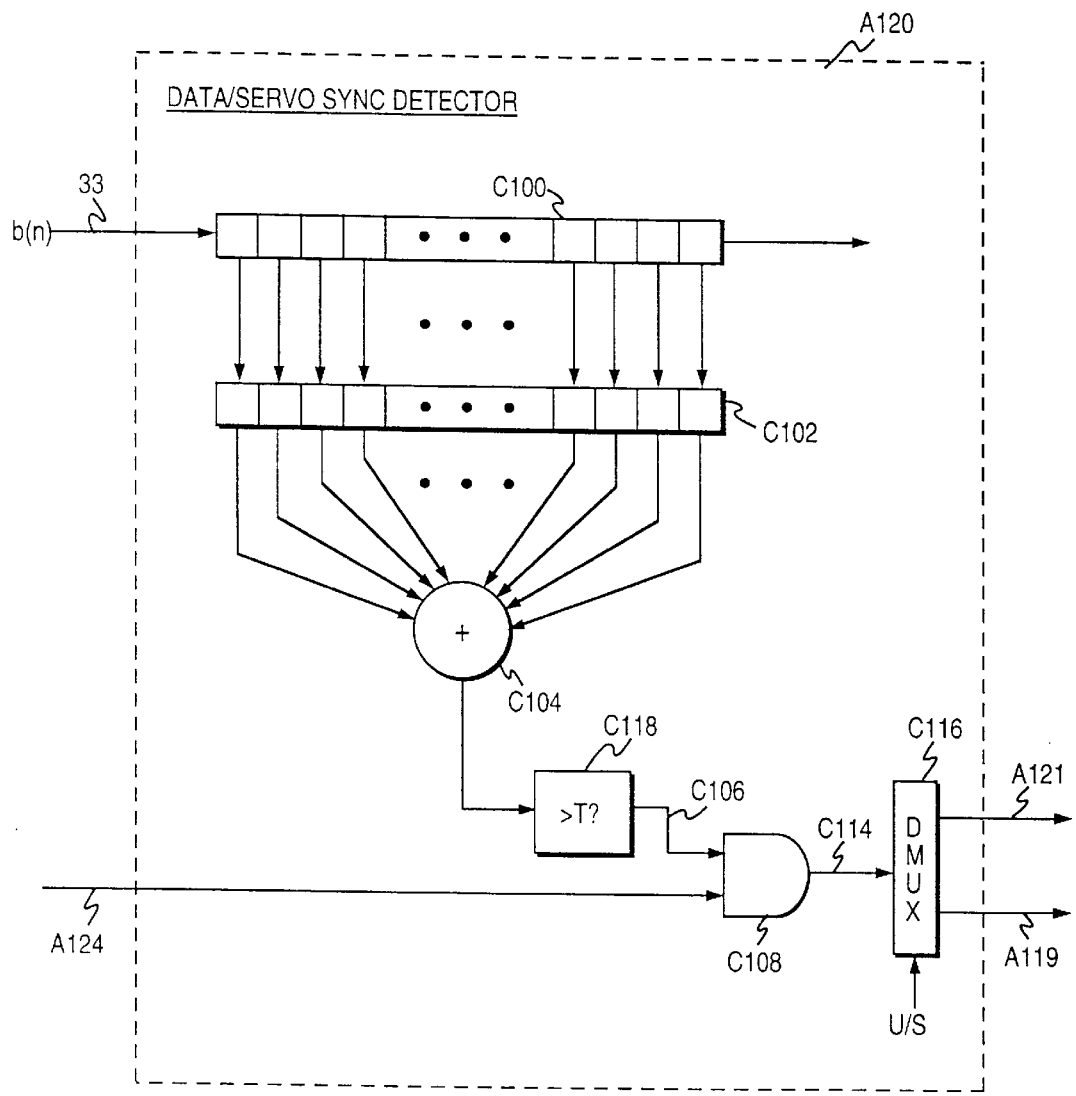
FIG. 9 shows more details of the data/servo sync detector and particularly the operation with respect to the timing recovery control signal.

Operation of the correlation process is understood with reference to FIG. 9. The estimated bit sequence b(n) 33 is shifted into a shift register C100 and the target sync mark (servo or data) is loaded into register C102. Registers C100 and C102 are programmable to accommodate various sync mark lengths. The corresponding bits of registers C100 and C102 are correlated (using an exclusive-nor gate not shown) and summed with an adder C104. A threshold comparator C118 compares the output of the adder C104 to a predetermined programmable threshold and outputs a threshold correlation signal C106. The threshold correlation signal C106 is enabled through an AND gate C108 by a control signal A124. The output C114 of the AND gate C108 is applied to the RLL decoder framing signals (A121,A119) through de-multiplexor C116 according to the state of the U/S control signal. The control signal A124 for enabling the threshold correlation signal C106 is understood in relation to the operation of the timing recovery circuit 28, an overview of which is provided in FIG. 7.

In FIG. 7, the output 23 of a variable frequency oscillator (VFO) B164 controls the sampling clock of a sampling device 24 which is typically an analog-to-digital converter (A/D) in digital read channels. A frequency error detector B157 and phase error detector B155 control the frequency of the VFO B164, and a loop filter B160 provides control over the closed loop characteristics. A multiplexor B159 may select the unequalized sample values 25 during acquisition, and the equalized sample values 32 during tracking. From the sample values received over line B149, the frequency error detector B157 generates a frequency error, and the phase error detector B155 generates a phase error. The phase error is also computed from expected sample values X(n) from an expected sample generator B151 during acquisition, and estimated sample values ~X(n) from a sample value estimator B141, such as a slicer according to Table B2, during tracking.

Referring again to FIG. 2B, before acquiring the acquisition preamble (68,5) the phase-lock-loop first locks onto a predetermined nominal sampling frequency for the zone where the current track is located. In this manner, the phase-lock-loop is close to the desired acquisition frequency when it switches to acquisition mode. As previously mentioned, the acquisition preamble (68,5) is processed during acquisition mode in order to lock the PLL to the desired sampling phase and frequency before sampling the user or servo data fields (72,3). Once locked onto the acquisition preamble, the phase-lock-loop switches into tracking mode and, after detecting the sync mark (70,7), begins tracking user or servo data (72,3).

A data generator 4, connected to the input of the precoder 10, outputs a series of "1" bits to generate a 2T training preamble sequence at the output of the precoder 10 of the form (1,1,0,0,1,1,0,0,1,1,0,0, . . .). This 2T preamble maximizes the magnitude of a PR4 read channel, and during acquisition, it is "side sampled" to generate the following sample sequence:
(+A,+A,−A,−A,+A,+A,−A,−A,+A,+A,−A,−A, . . . ).

Figure 10A:
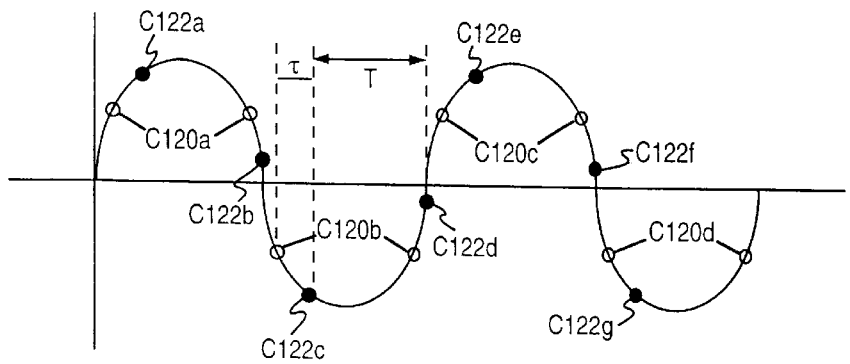
FIG. 10A shows the acquisition read signal with corresponding actual and estimated sample values.
Figure 10B:
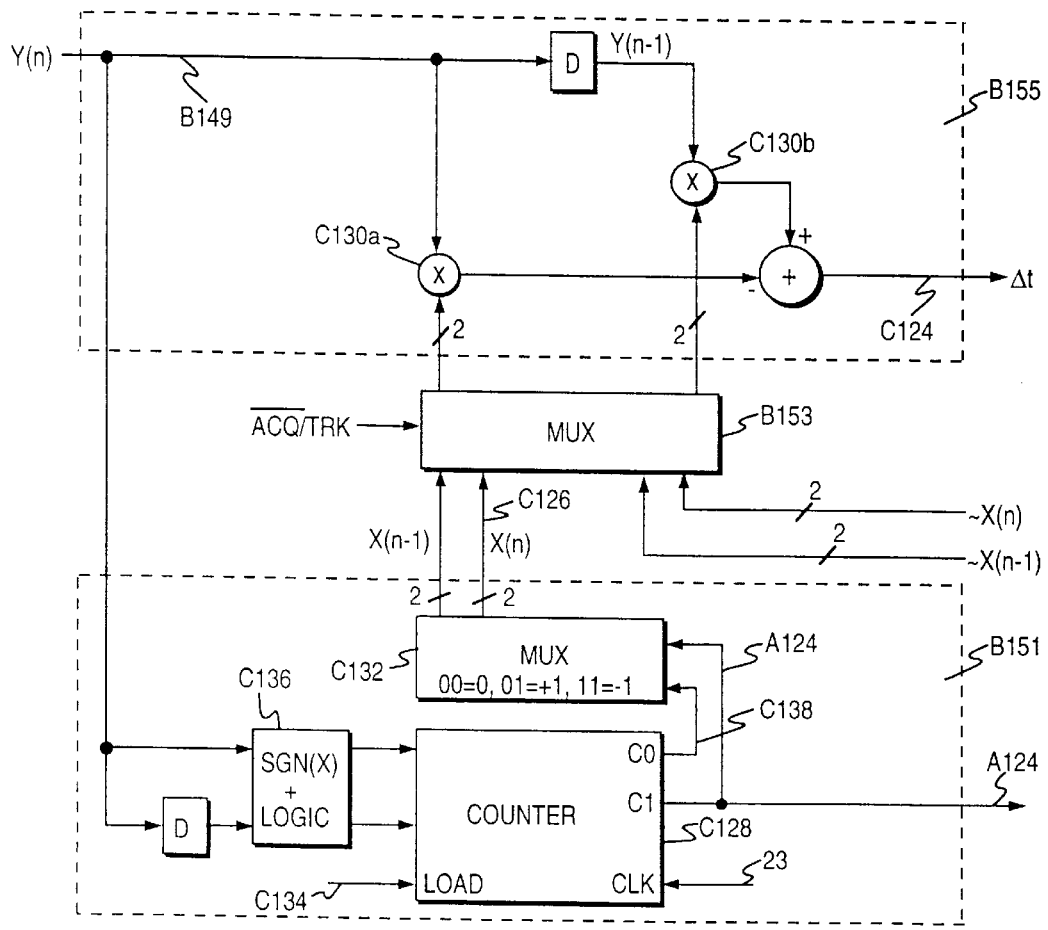
FIG. 10B is a detailed diagram of the preferred embodiment for the expected sample value generator and phase error detector used in the timing recovery circuit.

FIG. 10A shows the 2T preamble "side sampled" with the expected samples C120 in relation to the signal samples C122 and a corresponding phase error T. FIG. 10B shows an implementation of the phase error detector B155 and the expected sample value generator B151 of FIG. 7. To adjust the initial sampling timing phase, the phase error detector B155 computes a timing gradient which minimizes the mean squared error between signal sample values and expected sample values. The timing gradient value At C124 is computed as:

$$\Delta t(n) = Y(n-1).X(n) - Y(n).X(n-1)$$

where Y(n) are the signal sample values B149 and X(n) are the expected sample values C126.

Referring again to FIG. 10B, the outputs (C138,A124) of a 2-bit counter C128 correspond to the expected "side sampled" preamble sequence:
00→+A, −A
01→−A, −A
10→−A, +A
11→+A, +A.

The expected sample value is scaled to |A|=1 so that the multipliers (C130a,C130b) of the phase error detector B155 multiply by +1, −1 or 0. Thus, the expected sample values X(n) C126 are two bits wide in order to represent the ternary values:
(00=0, 01=1, and 11=−1).

A multiplexor C132, responsive to the outputs (C138,A124) of the counter C128, selects the expected sample values X(n) C126 which correspond to the current state.

The counter C128 is loaded C134 with an initial starting state by logic C136 in response to two consecutive sample values Y(n) B149. The counter output bits C0 C138 and C1 A124 are initialized to:
C0=sgn(Y(n−1)); and
C1=sgn(Y(n)) XOR sgn(Y(n−1))
where sgn(x) returns a 1 if x is positive and 0 if negative. Table C2 shows the "side sampled" starting state values loaded into counter C128 corresponding to the two consecutive sample values.

After the counter C128 is loaded with the initial starting state, it sequences through the states according to the expected samples in the 2T preamble at each sample clock 23. The four possible sequences are:
(+A,−A,−A,+A,+A,−A, . . . );
(−A,−A,+A,+A,−A,−A, . . . );
(−A,+A,+A,−A,−A,+A, . . . ); and
(+A,+A,−A,−A,+A,+A, . . . ).
As a result, a "hang up" problem associated with the prior art is avoided, and in addition, the state of counter C128 can be advantageously used in the selection and detection of the sync mark (70,7).

If the 2T acquisition preamble (68,5) always ends with two positive samples or two negative samples (e.g., samples C120d in FIG. 10A), then the sync mark (70,7) will be completely loaded into register C100 only when the counter C128 of FIG. 10B is in state (−A,−A) or state (+A,+A) which corresponds to counter C128 outputs 01 and 11. That is, register C100 of FIG. 9 will contain at least one bit of the acquisition preamble preceding the sync mark if the counter is in state (+A,−A) or (−A,+A) which corresponds to counter outputs 00 and 10. Therefore, the data/servo sync mark detector A120 should be enabled only when the counter C128 is in state (+A,+A) or state (−A,−A) (i.e., only at every other sample period). As shown in FIG. 9, the C1 counter output A124 is applied to the AND gate C108 to enable the threshold correlation signal C106 at every other sample period.

To ensure that the acquisition preamble (68,5) always ends in the desired phase state (such as two positive samples or two negative samples), the state of the precoder 10 is initialized to the appropriate value when writing the preamble (68,5) to the disk. For a PR4 read channel, for example, the delay registers in the $1/1+D^2$ precoder are initialized to zero and an even number of 1 bits are output by the data generator 4 to ensure that the preamble ends in either two positive samples or two negative samples.

Enabling the data/servo sync mark detector A120 at every other sample period aids in the computer search for the optimum fault tolerant sync mark. The search program can search for minimum correlation between the sync mark and shifted versions of the sync mark concatenated with the preamble at every other shift rather than at every shift. This increases the probability of finding a sync mark having a higher degree of fault tolerance.

The sync mark detection technique of the present invention can be easily extended to search for the sync mark at every fourth sample period rather than at every other sample period. This requires that the preamble always ends in the same two sample values (i.e., the preamble ends with the counter C128 always in one out of the four possible states). Further, this technique can easily be extended for use with other preamble formats (e.g., 3T, 4T, 6T, etc) and with other types of PR read channels (e.g., EPR4 and EEPR4).

Figure 11:
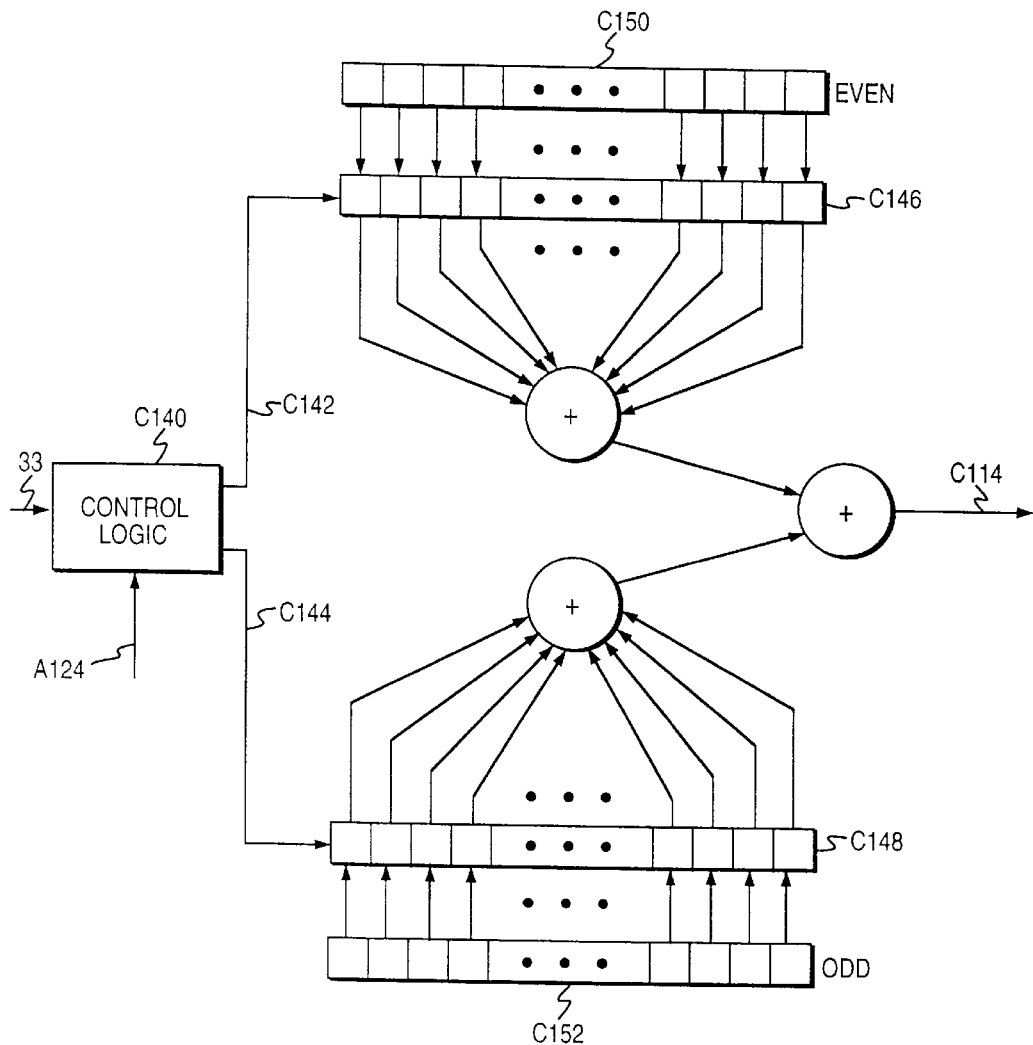
FIG. 11 is an alternative embodiment for the data/servo sync detector which processes the even and odd interleaves of the read signal in parallel.

In an alternative embodiment shown in FIG. 11, the data/servo sync mark detector A120 processes two bits of the detected sequence 33 at a time. The target sync mark C102 of FIG. 9 is separated into in an even and odd interleave and stored in an even register C150 and an odd register C152, respectively. Control logic C140 loads the even and odd interleaves (C142,C144) of the detected sequence 33 into respective shift registers (C146,C148) in response to the enable signal A124 from the counter C128. The control logic C140 delays loading the shift registers (C146,C148) with the detected sequence 33 until the counter C128 of FIG. 10B is in either state (−A,−A) or state (+A,+A) which corresponds to counter C128 outputs 01 and 11.

In yet another embodiment not shown, the data/servo sync mark detector A120 correlates estimated sample values with expected sample values that corresponded to the target sync mark. For the purpose of this disclosure, then, the data/servo sync mark detector A120 is specified, in general, as generating channel values in response to the discrete time sample values and correlating the channel values with target values of a target sync mark.

The operation of the data/servo sync mark detector A120 can be described mathematically by the following equation:

$$Y(k) = [t_0, t_1, \ldots t_{N-1}] \cdot [S_k, S_{k+1}, \ldots, S_{k+N-1}]^T \cdot I;$$

where
Y(k): output C114 of the data/servo sync mark detector A120;

k: the sample value index;
[$t_0, t_1, \ldots t_{N-1}$]: the target values of the target sync mark;
[$S_k, S_{k+1}, \ldots, S_{k+N-1}$]: the channel values;
N: length of the target sync mark;
I: a sample period interval that is equal to 1 when k modulo Q is a member of a set S and 0 otherwise, where Q is a predetermined integer not equal to 1.

For the 2T acquisition preamble (68,5) described in the above example where the output of the data/servo sync mark detector A120 is enabled at every other sample value, Q=2 and the set S={0}.

Asynchronous Servo Address Mark Detector

When the disk drive is initially turned on, the read head is launched from a parked position, normally near the center of the disk, radially out over the rotating medium. The initial head location with respect to the tracks and servo wedges is unknown. It is important to determine the location of the servo wedges quickly and start servoing before the head crashes into the enclosure of the disk drive. Synchronous detection of the servo wedges is not possible when the locations of the servo wedges are unknown because timing recovery cannot locate and acquire the servo wedge preamble. Therefore, a special sequence of bits (normally comprised of a long sequence of "0" bits) referred to as the servo address mark is recorded in at least one of the wedges. An asynchronous servo address mark detector A126 of FIG. 3 searches for this special sequence of bits and generates a control signal A118 when found. Once the servo address mark has been detected, the read channel can locate and acquire the remaining servo wedges.

When searching for the servo address mark, the analog and discrete time equalizing filters 20 and 26 are first initialized with the calibration values corresponding to the highest data rate of the inner zone (which is typically the user data rate). The channel is normally equalized to the user data rate, rather than the servo data rate, to prevent false detection of the servo address mark in the user data field. The user data synthesizer A100 is programmed to a predetermined frequency higher than the servo data rate, and multiplexor A112 selects the center frequency control signal A110 from the user data synthesizer so that the timing recovery circuit 28 samples 24 the read signal 62 at this frequency.

Because the servo address mark is detected asynchronously, the user and servo data gain error detector B143 of FIG. 6 cannot be used when seeking for the servo address mark. Instead, a SAM gain error detector B145 operates according to an algorithm that is less sensitive to amplitude fluctuations over long blocks of data. Basically, the SAM error detector attempts to adjust the gain of the read signal according to a predetermined set point and the maximum absolute sample value over a programmable block length. The SAM gain error equation is:

$$\text{Gain\_Error} = \text{Set\_Point} - \text{Max}(|\text{Sample\_Value}(n)|); n = k \to k+N$$

where the Set_Point and N are programmable.

When searching for the servo address mark, a SAM detect signal A118 from the servo address mark detector selects the output of the SAM gain error detector B145 as the input into the gain control filter of FIG. 6. Once the servo address mark has been detected, control line A118 selects, as input to the gain control filter, the output of the data gain error detector B143.

Servo Control

Figure 2A:
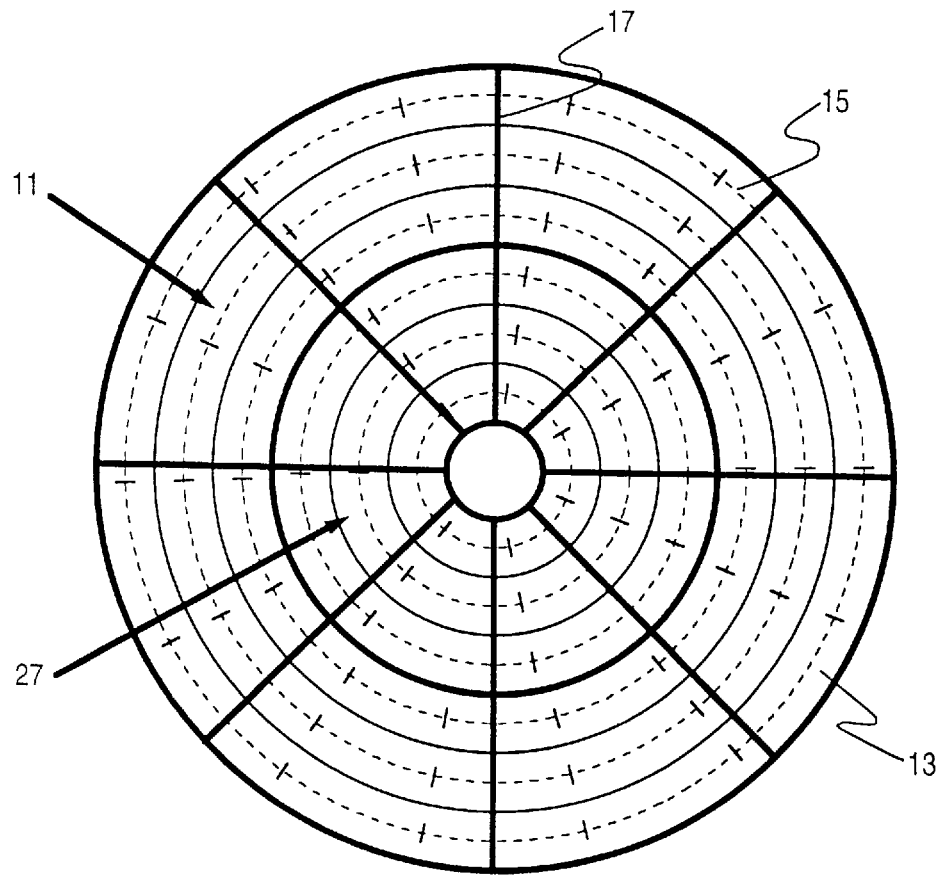
FIG. 2A shows an exemplary data format of a magnetic disk having a plurality of concentric tracks recorded in zones at varying data rates where each track contains a plurality of user data and embedded servo data sectors.
Figure 2B:
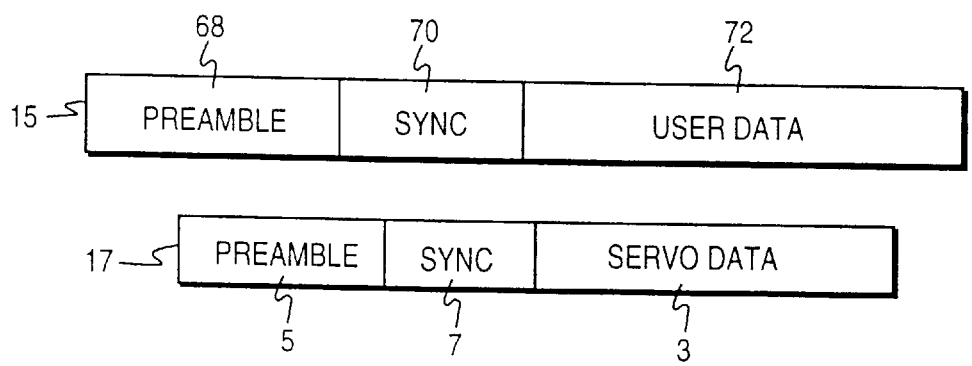
FIG. 2B shows an exemplary format of a user data sector and an embedded servo data sector.

The features of the present invention interact with and respond to the servo control information contained in an embedded servo field 3 as shown FIG. 2B. Typically, the servo field 3 contains digital information (such as the track ID) for determining the inter-track position of the read head, and servo burst information for determining the centerline offset of the read head. The servo controller processes the inter-track information when seeking to a new track and the servo bursts when tracking the centerline of a selected track during a read or write operation.

Figure 12:
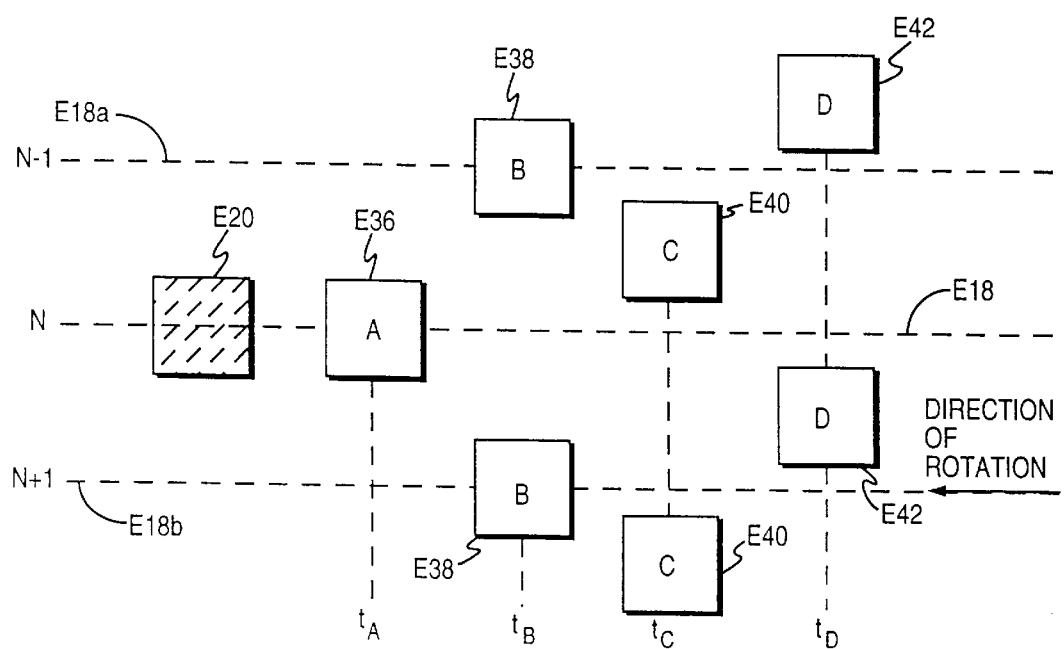
FIG. 12 is a simplified and enlarged illustration of a read/write head (shown in phantom) along a track centerline prior to the off-track servo burst passing underneath the head due to the rotation of the disk.

Referring to FIG. 12, the read head E20 generates an analog signal as it passes over an "A" off-track burst E36, a "B" off-track burst E38, a "C" off-track burst E40 and a "D" off-track burst E42. The dibits of the B, C and D bursts E38–E42 are located at positions off of or to the side of the track center line E18. When the dibits of the A, B, C and D bursts E36–E42 are read by the head E20, four different analog signals result, depending on the physical position of the head E20 relative to the bursts. The analog nature of the signals derived by the bursts E36, E38, E40 and E42 are differentiated by different magnitudes.

The dibit patterns of the off-track bursts E36, E38, E40 and E42 are very accurately positioned or written to the disk surface using a laser interferometer, laser positioning system or other suitable technique. The dibit off-track bursts E36, E38, E40 and E42 are commonly located at predetermined locations with respect to the track center line E18, as shown in FIG. 12. In this example, each track includes a C burst E40 and a D burst E42 positioned adjacent to but on opposite sides of the track center line E18. Each track also includes either an A burst E36 or a B burst E38. For example, each track having an even track number may have an A burst E36, while the odd numbered tracks on each side of the even numbered track include a B burst E38. Track center lines E18*a* and E18*b* respectively represent the track numbers N−1 and N+1 of the track number N represented by the center line E18. With the alternating occurrence of the A and B bursts E36, E38 on adjacent tracks E18, and the consistent positional relationship of the C and D bursts E40, E42 on each track E18, there is no overlap or conflict in the position of the bursts on the tracks.

The derivation of the different magnitude analog off-track signals by the head E20 reading the bursts E36, E38, E40 and E42 can be understood by reference to FIG. 12. The head E20 is shown positioned directly above the track center line 18 as the off-track servo bursts E36, E38, E40 and E42 approach due to the rotation of the disk. At time tA, the A burst E36 will pass directly beneath head E20. At time tB, the B bursts E38 from the adjacent track center lines E18*a* and E18*b* will pass substantially to sides of the head E20. At time tC, the C burst E40 will pass under approximately one-half of head E20, while at time tD, the D burst E42 will also pass beneath approximately the other one-half portion of head E20.

The dibit magnetic reversals of the bursts E36, E38, E40 and E42 induce alternating electrical signals when the head passes over the bursts. The alternating analog signals are then typically amplified, full-wave rectified, peak detected, and sampled and held in a conventional read write channel (not shown). Alternative techniques, such as integration of the detected analog signals, may be utilized in the read write channel rather than full wave rectification and peak detection.

The analog magnitude of the induced signals corresponds to the extent of the influence of the magnetic dibits on the head E20 as the off-track bursts pass under the head E20. The signals derived from the bursts E36, E38, E40 and E42 are essentially related to the amount of area of the bursts which pass directly underneath the head E20. The amplitude sensed from the off-track bursts will be a maximum when the bursts are in the most direct alignment with head E20. For example, since head E20 is in direct alignment with the center line E18, as shown in FIG. 12 at time tA, a maximum amplitude signal will be derived by the head E20 and held by the read write channel from the A burst E36 passing under the head E20. The relatively high amplitude analog signal results because of the maximum interaction of head E20 with the magnetic transitions of the A burst E36 due to the center line E18 alignment of the head E20 over the A burst E36.

Conversely, the complete off-track alignment of the B bursts E38 results in the head E20 sensing little or no signal from the passage of the B bursts E38 at time tB. As head E20 remains on the center line E18, it will derive an approximately half amplitude signal (relative to the maximum signal) at time tC from the C burst E40 and an approximately half amplitude signal at time tD from the D burst E42.

If instead of the example shown in FIG. 12, the head E20 was aligned on one of the adjacent odd numbered tracks E18a or E18b, little or no signal would be derived at time tA because the head E20 would pass to the sides of the A bursts E36, but a maximum signal would be derived at time tB because the head E20 would pass directly over the B burst E38 on the track center line E18a or E18b. The signals derived at times tC from the C burst E40 and at time tD from the D burst E42 would be approximately one half of the value of the maximum value, as was the situation on the even numbered track.

The signals derived from the A, B, C and D bursts E36–E42 on each track E18 are sometimes referred to a quadrature signals or quadrature information. Based on the quadrature signals and the track number, an appropriate control signal may be conveniently derived from the appropriate quadrature signals. Derivation of the control signal is based on the largest one of the quadrature burst signals. It should also be recognized that different patterns and sequences of servo off-track bursts may be employed to detect off-track information other than the above described quadrature control system technique, but the principles described above with respect to the quadrature technique may be adapted to other types of control systems using position defined fields to derive analog signals indicative of the position of the head E20.

Figure 13:
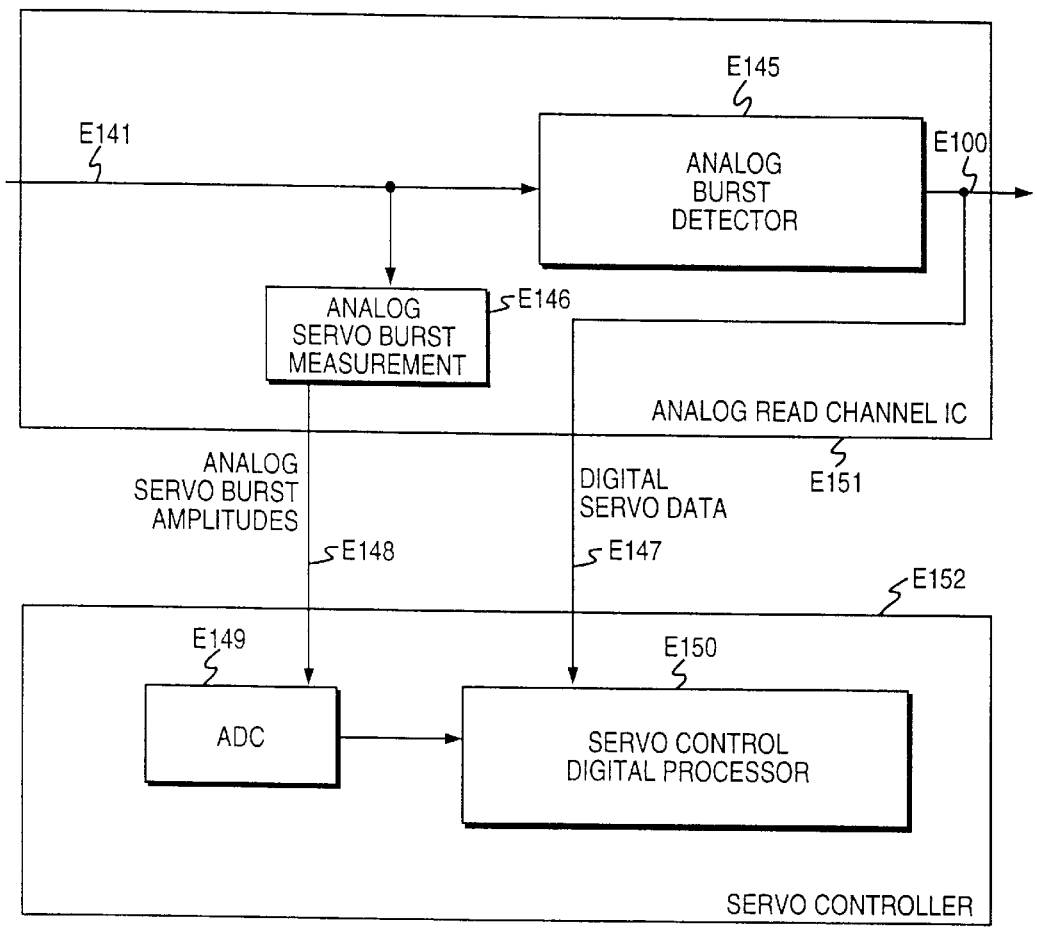
FIG. 13 illustrates a conventional analog read channel and associated servo controller, the former incorporating an analog pulse detector and analog servo burst measurement circuit for providing digital servo data and analog burst signals, respectively, to the servo controller.

With reference now to FIG. 13, a conventional analog peak detector read channel E151 is shown incorporating an analog pulse detector E145 and servo burst area detect E146 circuits to supply signals representative of servo data E147 and servo burst amplitudes E148, respectively, to an associated servo controller E152 incorporating an on-board ADC E149. The head signal appearing on line E141 is supplied to the analog pulse detector E145 for detecting the user data E100 and the servo data E147. The head signal E141 is also supplied to the analog area detect or peak detect E146 circuit for measuring the servo burst amplitudes E148. Digital servo data on line E147 is passed directly to the servo control digital processor E150 from the analog pulse detector E145 while an analog signal representative of the burst amplitudes on line E148 is passed to the ADC E149 of the servo controller E152.

Figure 14:
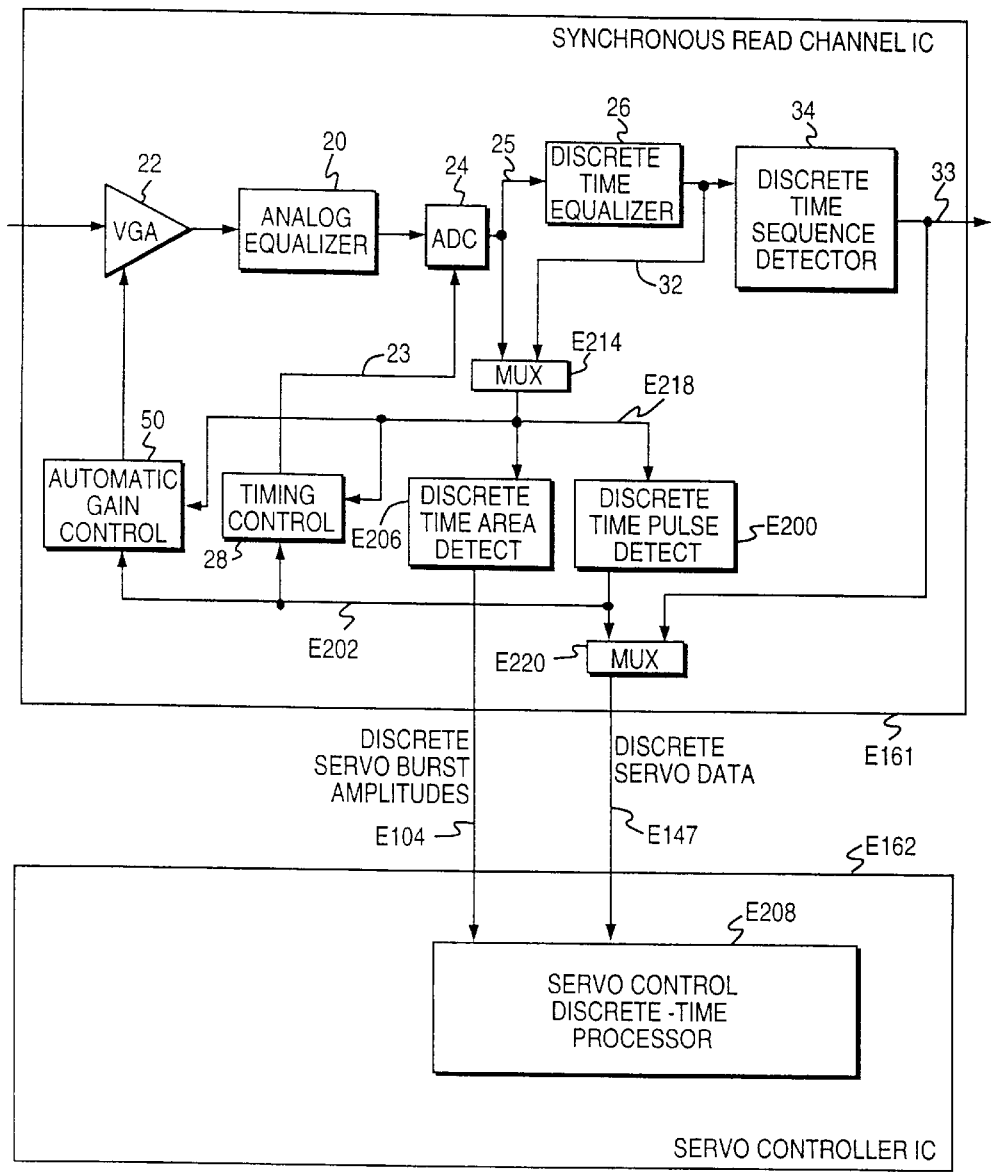
FIG. 14 illustrates a sampled amplitude read channel and associated servo controller in accordance with the discrete time servo demodulator circuit of the present invention wherein the read channel comprises a discrete time area detection circuit and discrete time pulse detection circuit for providing the servo controller with digital information representative of the servo burst and servo data, respectively, and wherein the servo controller need not incorporate an additional ADC circuit.

Referring now to FIG. 14, a sampled amplitude read channel E161 and associated servo controller E162 in accordance with the present invention is shown using discrete time servo demodulation which is more efficient for sampled amplitude read channels and further reduces the duplication of the corresponding portions of the ICs illustrated in FIG. 13. The sampled amplitude read channel E161 operates in the same manner as described in FIG. 1. In addition, a multiplexor E214 selects either the ADC output 25 or the discrete time equalizer output 32 as the input to a discrete time asynchronous area detect circuit E206 and an asynchronous discrete time pulse detector E200. A multiplexor E220 selects as the detected servo data E147 sent to the servo controller discrete time processor E208 either the output of the asynchronous pulse detector E202 or the detected data ^b(n) 33 from the synchronous discrete time sequence detector 34.

As can be observed in FIG. 14, the ADC E149 of the conventional servo controller E152 in FIG. 13 is obviated by the present invention because the servo burst information is sampled using the read channel ADC 24 of FIG. 14 and processed in discrete time. Consequently, the interface between the sampled amplitude read channel E161 and servo controller E162 is all digital. Another illustrated advantage is to detect the servo data E147 using the discrete time pulse detector E200 already provided in the sampled amplitude read channel E161 for timing and gain control. Thus, the analog pulse detection circuitry in conventional servo demodulation is also obviated. The only additional circuitry necessary to implement the servo demodulation technique of the present invention is a discrete time area detect circuit E206 which provides discrete servo burst amplitude information to the servo controller E162 over line E104.

Digital Servo Data Detection

Figure 15:
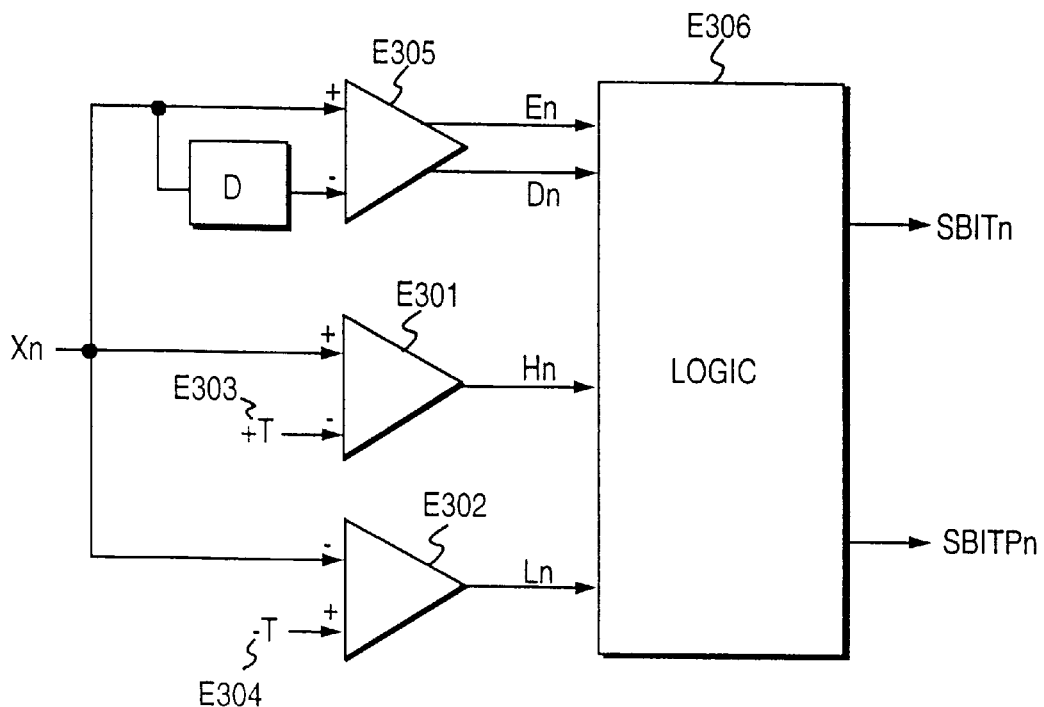
FIG. 15 is a functional block diagram of a peak detector circuit for use in conjunction with the discrete time servo demodulator of the present invention.

With reference now to FIG. 15, shown is an asynchronous pulse detector in accordance with the present invention for use in conjunction with the digital servo demodulator circuit. The samples Xn are supplied to the positive inputs of comparators E301 and E305 as well as to the negative input of comparator E302. A delayed sample is supplied to the negative input of comparator E305 as shown. The outputs of comparators E301, E302, and E305 are supplied to a logic block E306 to provide the signals SBITPn and SBITn which correspond, respectively, to the presence and polarity of detected pulses.

The servo signal is sampled by the ADC 24 of the read channel E161 (shown in FIG. 14) at a rate faster (typically more than 4 times faster) than the rate of pulses in the servo data fields. ADC 24 samples Xn are compared to thresholds T+ E303 and T– E304 to create the bits Hn and Ln, respectively. If the sample Xn is greater than T+ E303 then Hn is active. If, on the other hand, Xn is less than T– E304 then Ln is active. In addition, samples Xn are compared to the previous samples Xn–1 to create the bits En and Dn. If Xn is greater than Xn–1 then Dn is active. Alternatively, if Xn is equal to Xn–1 then En is active.

Figure 16:
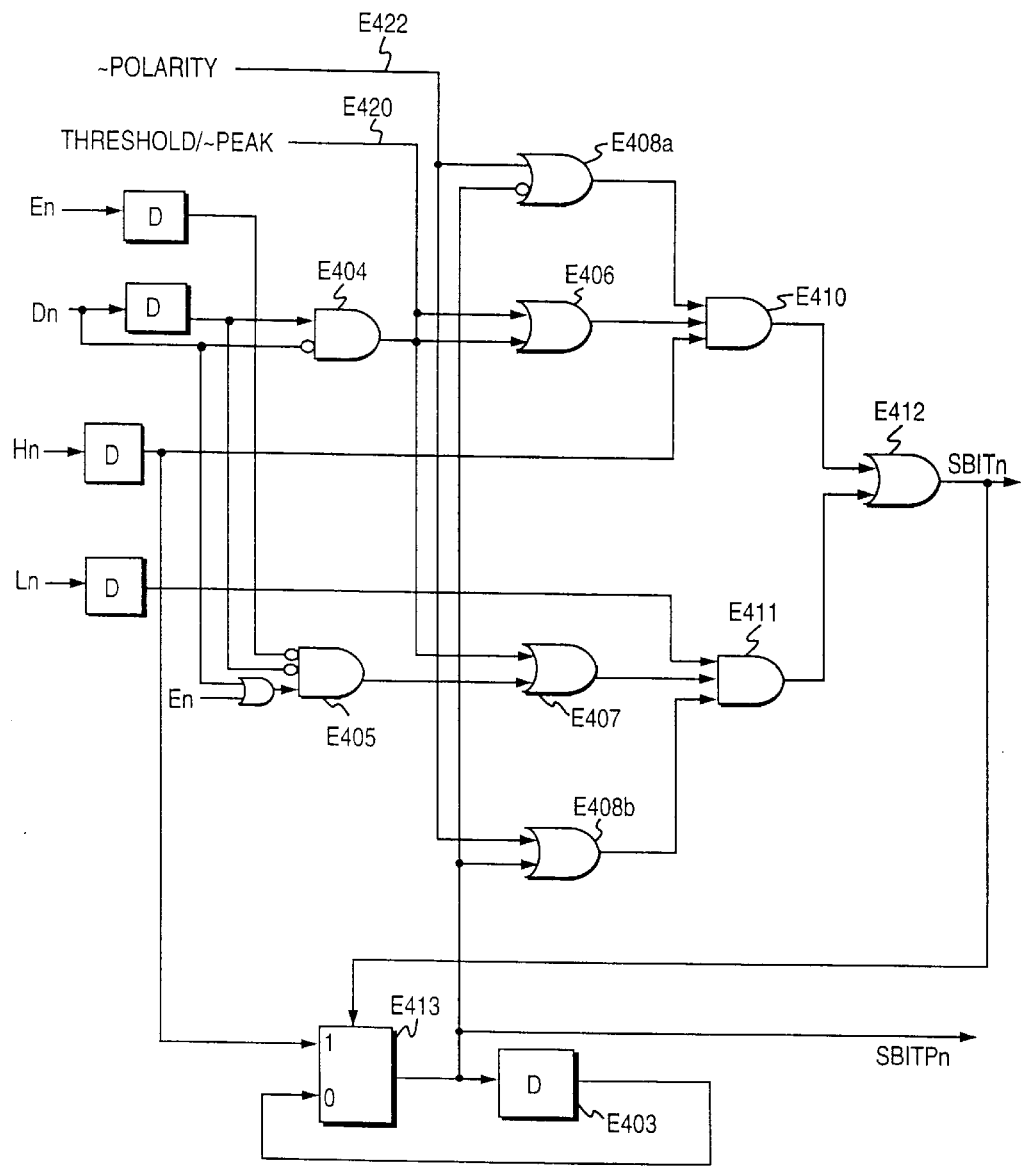
FIG. 16 is a more detailed logic block diagram of the peak detector operable to produce output data in one of four modes of operation.

The logic block E306 illustrated in FIG. 15 is shown in more detail in FIG. 16. The servo bit detector can operate in four modes. Mode 1: Peak detection with polarity qualification; Mode 2: Peak detection without polarity qualification; Mode 3: Threshold detection with polarity qualification; and Mode 4: Threshold detection without polarity qualification. The output data bits SBITPn and SBITn are derived by the circuit of FIG. 16.

The signal En is delayed through a delay element and applied to an inverting input of AND gate E405. Similarly, the signal Dn is delayed through a delay element and applied to a non-inverting input of AND gate E404 and an inverting input of AND gate E405. The signal Dn is also directly supplied to an inverting input of AND gate E404 and a non-inverting input of AND gate E405.

The output of AND gate E404 is supplied as one input to OR gate E406 which has its other input coupled to a Threshold/~Peak signal E420. Threshold/~Peak signal E420 is also provided as an input to OR gate E407. The remaining input to OR gate E407 is taken at the output of AND gate E405. A ~Polarity signal E422 is supplied as one input to OR gate E408a and OR gate E408b. The outputs of OR gates E406 and E408a in conjunction with the delayed threshold signal Hn−1 are supplied as inputs to three input AND gate E410 which has its output coupled as one input to OR gate E412. In like manner, the outputs of OR gates E407 and E408b in conjunction with the delayed threshold signal Ln−1 are supplied as inputs to AND gate E411 having its output comprising the remaining input to OR gate E412.

The signal Hn is delayed by one clock and then supplied as the first input to multiplexer ("mux") E413. The output of mux E413 is selected by the output of OR gate E412 SBITn. The output of mux E413 is coupled to a delay register E403 as shown with the signal SBITPn derived therebetween. The output of the delay register E403 is provided as the second input to mux E413. The signal SBITPn qualifies the outputs of OR gates E408a and E408b such that only peaks alternating in polarity are detected when in polarity qualification mode.

In operation, the output of AND gates E410 and E411 indicate the presence of a positive or negative pulse. The outputs of these gates are ORed E412 to generate the SBITn signal indicating the presence of a pulse. In peak mode, positive and negative peaks are detected by AND gates E404 and E405 respectively. The logic equation for positive peak detecting AND gate E404 is:

+Peak=!Dn AND Dn−1; or,

+Peak=!(Xn>Xn−1) AND (Xn−1>Xn−2).

The logic equation for negative peak detecting AND gate E405 is:

−Peak=!En−1 AND !Dn−1 AND (Dn OR En); or,

−Peak=!(Xn−1==Xn−2) AND (Xn−1>Xn−2) AND !(Xn<Xn−1); or,

−Peak=(Xn−1<Xn−2) AND !(Xn<Xn−1).

Figure 17:
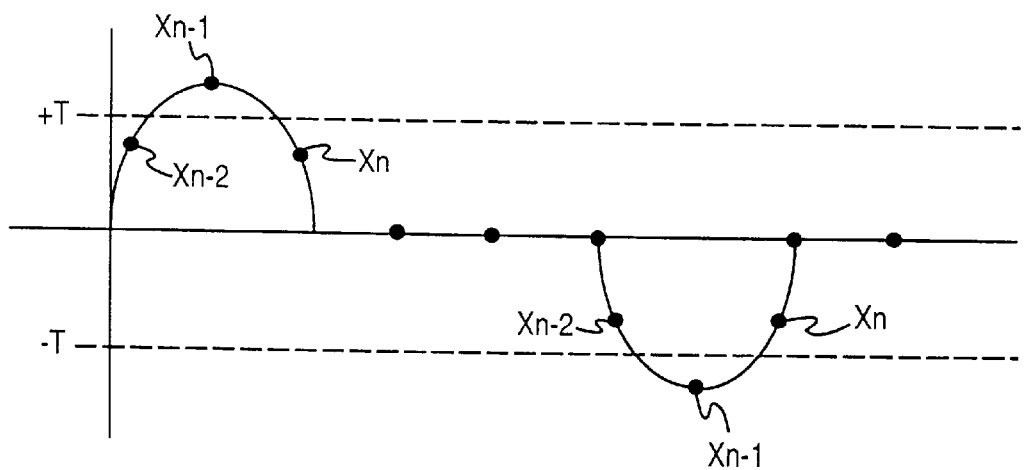
FIG. 17 illustrates the operation of the peak detector when processing the sampled analog signal from the magnetic read head.

From these equations, it is understood that a peak is only detected if there is a change of slope in the analog signal. This is illustrated in FIG. 17.

If Threshold/~Peak signal E420 is low (peak mode), then the peak signals from AND gates E404 and E405 are passed by OR gates E406 and E407. The peaks are qualified by thresholds Hn−1 and Ln−1 through pulse detecting AND gates E410 and E411. That is, a pulse will only be detected if Xn−1 exceeds the positive or negative threshold for a positive or negative peak, respectively, as shown in FIG. 17.

If Threshold/~Peak signal E420 is high (threshold detect mode), the outputs of OR gates E406 and E407 are always active, and the output of pulse detecting AND gates E410 and E411 are responsive only to the threshold signals Hn−1 and Ln−1 and the polarity qualification signals from OR gates E408a and E408b.

If the ~Polarity signal E422 is low (polarity qualify mode), OR gates E408a and E408b pass the polarity signal SBITPn to AND gates E410 and E411 which will then detect pulses of alternating polarity only. If the ~Polarity signal E422 is high, the outputs of OR gates E408a and E408b are always active thereby disabling the polarity qualification mode.

The polarity qualification signal SBITPn is generated as follows. When a pulse is detected, the SBITn signal is active and selects as output of mux E413 (which is also SBITPn) the delayed threshold signal Hn−1. If the currently detected pulse is positive, then Hn−1 (and SBITPn) is high and the expected polarity of the next pulse negative. Otherwise, Hn−1 (and SBITPn) is low and the expected polarity of the next pulse positive. Delay register E403 stores the updated value of SBITPn until the next pulse is detected. The pulse detection AND gates E410 and D411 are enabled according to the expected polarity of the next pulse through OR gates E408a and E408b. That is, a positive or negative pulse will only be detected if the polarity of signal SBITPn is opposite in polarity of the pulse detected.

By oversampling (sampling faster than the baud rate), the detection of servo data is relatively insensitive to the phase and frequencies of the ADC 24 clock of the read channel E161 shown in FIG. 14. The flexibility of the detector modes provides good performance over a variety of conditions including servo data rates and filtering. Alternatively, the sequence detector 34 (commonly a Viterbi type sequence detector) of the sampled amplitude read channel E161 may be used to detect servo data synchronous to the baud rate in the same way user data is detected rather than using a pulse detector. Detecting the servo data with a sequence detector can be more accurate and more efficient, especially if the sampled amplitude read channel does not otherwise use a pulse detector E200.

Digital Servo Burst Measurement

Figure 20:
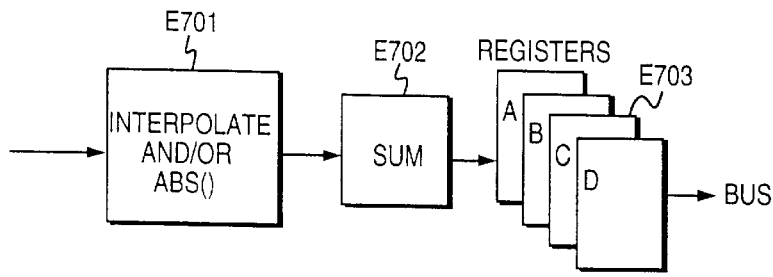
FIG. 20 is a simplified logic block diagram of a discrete time area detect circuit wherein the signal samples are first passed through a non-linearity block and then summed in an accumulator prior to being stored in a corresponding register.

With reference now to FIG. 20, an asynchronous servo burst demodulator for use in conjunction with the present invention is shown. The asynchronous servo burst demodulator comprises a nonlinearity circuit E701 for performing an absolute value (ABS) or interpolate function coupled to an accumulator E702, which in turn is coupled to a number of registers E703 designated A, B, C and D. In burst amplitude detection, the ADC 24 (shown in FIG. 14) signal samples are first passed through the nonlinearity circuit E701 and then summed in the accumulator E702. The resulting amplitude measurements are held in the register E703 depending on the burst selection signal Bsel.

The accumulation of samples tends to cancel errors due to ADC quantization. This quantization error is reduced with the number of signal samples accumulated leaving a residual error which appears similar to a small amount of added noise. However, this accumulated error is much less than the typical noise otherwise experienced in the data channel. The digital area detection technique of the present invention, therefore, has advantages over an alternative digital burst amplitude measurements with respect to noise immunity. Since noise in the signal samples is accumulated, and effectively averaged, the noise tends to cancel as in a low bandwidth filter. Thus, for typically strong signals, the noise performance of digital area detection is close to that of the theoretically optimum detector. Also, accumulating the burst amplitude signal samples increases the effective resolution of the channel ADC in proportion to the number of samples accumulated. In this manner, the resolution of the channel ADC (typically 6 bits) is effectively increased by 2 to 4 bits or more.

Still another advantage of a digital area detection technique is its relative insensitivity to direct current ("DC") offsets in a magnetic channel servo signal. Since the signal slope through the zero level is fairly high, a DC offset in the signals tends to add about as much area to half of the pulses as it subtracts from the other half giving a net zero change in measured amplitude to a first order approximation. Yet another advantage of a digital area detection technique is that it tends to de-emphasize the anomalous amplitude of one pulse by averaging many pulses in a burst. This is significantly better than a peak detection technique which can respond fully to a single anomalous pulse.

Figure 19A:
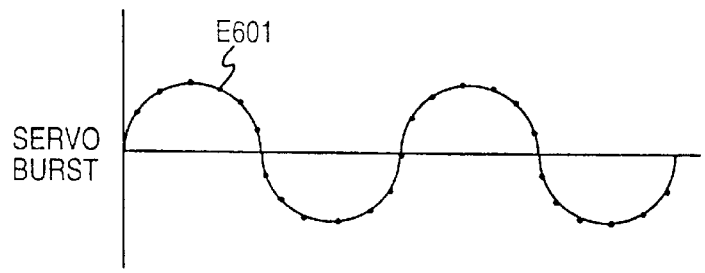
FIGS. 19A–19D illustrate a sampled servo burst signal and corresponding rectified burst samples, squared burst samples and interpolated burst samples respectively, useful for understanding the principles of the discrete time area detect circuit of the discrete time servo demodulator circuit of the present invention.
Figure 19B:
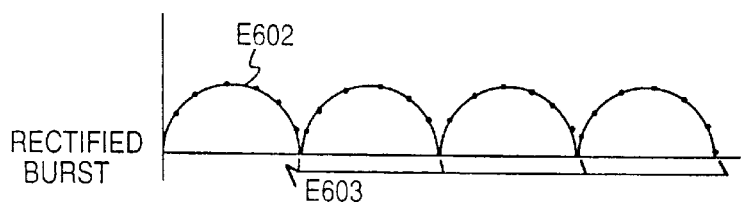

With reference now to FIGS. 19A–19D, the functionality of the asynchronous servo demodulator circuit of the present invention is shown. In a basic area detection function, the ADC 24 (shown in FIG. 14) signal samples are full wave rectified by an absolute value operation and then accumulated. As shown in FIG. 19B, the rectified signal E602 has steep notches at zero crossing E603 of the servo burst E601 shown in FIG. 19. With some sample rates, many signal samples can fall at the bottom of these notches or just outside of the notches giving significantly different burst amplitude measurements depending on the phase of the servo burst relative to the ADC 24 clock.

The asynchronous servo demodulator circuit of the present invention incorporates a predetermined subset of five techniques overcoming this problem of sampling phase sensitivity: (a) control the sampling frequency relative to the burst frequency, (b) clock dither and frequency control, (c) squaring, (d) interpolation (e) and control of the accumulation window. Each technique tends to reduce the variation of the burst amplitude measurement with phase.

The simplest technique for reducing phase sensitivity is to control the sample frequency relative to the servo burst frequency so that only a few samples can line up with the zero crossings in a single servo burst. Nevertheless, this may not be practical in some disk drives since there are often limitations in the burst rates which may be written. Moreover, the servo burst frequency varies during read back with the angular velocity of the disk relative to the read/write head.

Figure 18:
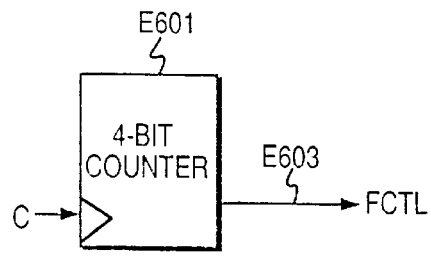
FIG. 18 is a simplified logic block diagram of a frequency dither circuit which allows the sampling frequency to be changed over a set of frequencies within a small fraction of a nominal sampling rate.

With reference additionally to FIG. 18, another technique which reduces phase sensitivity is to "dither" or "sweep" the ADC sampling frequency so that few samples can line up with the zero crossings in one servo burst. Utilizing this technique, the ADC 24 sampling frequency is changed over some set of frequencies within a small fraction of a nominal clock rate. If one of these frequencies allow samples to align with zero crossings, it only lasts for a short time and the number of unreliable samples is therefor minimized. Further, clock control tends to randomize the errors due to ADC quantization. This enhances the resolution improving effect of accumulating several sample values.

Dithering or sweeping the ADC 24 sampling frequency may be implemented as shown in FIG. 18 wherein a four-bit counter circuit E601 sequences through 16 binary states which are passed to the frequency control bus E603. This frequency control bus offsets the ADC 24 sampling frequency by a fractional amount based on a binary number representation.

Figure 19C:
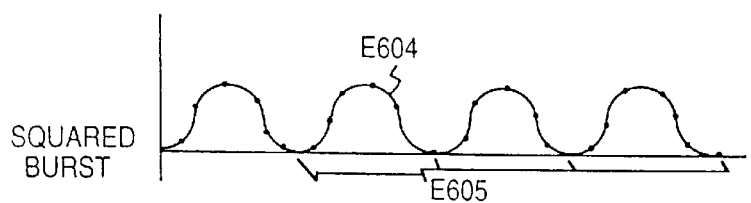

Referring specifically to FIG. 19C, another technique for reducing phase sensitivity is to use a squaring operation for rectifying the signal. Since the filtered servo burst is very near sinusoidal, after squaring, the signal E604 has the form of a sinusoid shifted so that its minimum value E605 is zero. Then, since the squared servo burst is accumulated for an integer number of cycles, the sinusoidal variation cancels (to the first order) leaving the average value which is proportional to the servo burst energy independent of the phase. One disadvantage of this technique is that it requires more data precision, more complicated circuitry for rectification, and may require a square root operation to be performed on the result. A further disadvantage of a squaring operation is that it can inadvertently emphasize noise.

Figure 21:
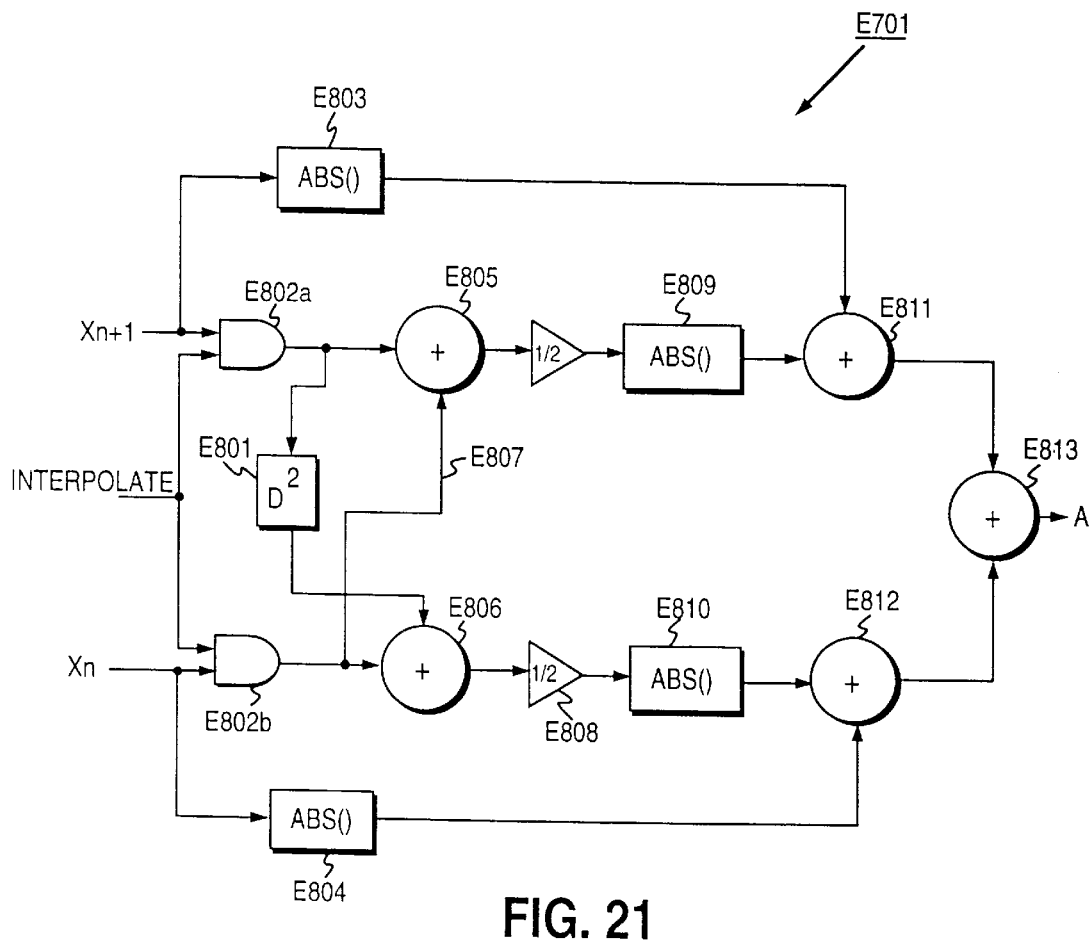
FIG. 21 is a logic block diagram of a portion of the discrete time area circuit of the present invention wherein all samples and interpolated samples are rectified and accumulated to produce a servo burst amplitude measurement with the signal samples being processed in parallel.

Referring now to the logic block diagram of FIG. 21, another technique for reducing phase sensitivity is interpolation. In this technique, consecutive samples are averaged to estimate the servo burst signal at the time between signal samples. Then all samples and interpolated samples are rectified an accumulated to produce a burst amplitude measurement.

As shown in FIG. 21, an ABSO or interpolate circuit E701 is shown. Circuit E701 comprises a pair of AND gates E802a and E802b to receive pairs of consecutive input samples Xn+1 and Xn as well as an interpolate enable signal on line E801. Processing two samples at a time allows for half-rate sampling. The output of AND gate E802a is summed with the output of AND gate E802b in adder E805 and divided by two with a simple shifter E807. The output of shifter E807 is supplied to an abso function logic block E809 for application to adder E811. Adder E811 takes the sample Xn+1 through the absolute value operator function block E803 and provides it as one input to adder E813.

In like manner, the output of AND gate E802b is summed with the delayed output of AND gate E802a in adder E806 for division by two through shifter E808 for application to abso function logic block E810 and subsequent application to adder E812. Adder E812 has as an additional input the signal Xn as received through the absolute value operator function block E804. The output of adder E812 provides the second input to adder E813 to produce the area signal "A."

As shown in FIG. 21, signal samples are processed in parallel. When the "interpolate" signal on line E801 is inactive, the AND gates E802a and E802b block the input signals and the output of the inner "abs" operators E809 and E810 are zero. Then, the signal samples Xn+1 and Xn are rectified by the absolute value operators E803 and E804 and summed by the adders E811 and E812. This result is accumulated for a fixed even number of clock cycles. When the "interpolate" signal on line E801 is active, the AND gates E802a and E802b pass the signal samples to the interpolator.

In the upper branch, the signal samples Xn+1 and Xn are summed by the adder E805 and divided by two with a simple shifter E807. The resulting interpolated sample is rectified at block E809 and added to the non-interpolated signal in adder E811. Likewise, in the lower branch, signal sample Xn is added to the delayed signal Xn+1 (that is, Xn−1) in adder E806 and is divided by two in the shifter E808. The resulting interpolated sample is rectified in block E810 and added to the non-interpolated sample Xn in adder E812. The two sums are then added in adder E813 giving an output which is the sum of two rectified samples and two rectified interpolated samples.

Figure 19D:
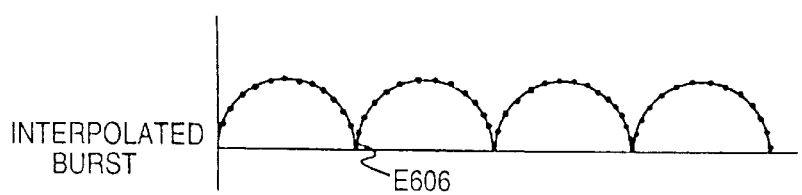

The results of interpolating before rectification is that more samples are accumulated near the servo burst zero crossings filling in the notches shown in FIG. 19D. This is close to the same result as if the signal were sampled at twice the rate. Since more samples appear in the notches of the rectified servo burst, the signal is more accurately represented and the resulting servo burst amplitude varies less with sampling phase. This technique has the advantage of simpler circuitry than squaring along with better noise performance. Therefore, the preferred implementation of digital area detection uses interpolation to reduce phase sensitivity along with frequency control and dither. This combination of techniques is relatively simple to implement in accordance with the present invention and provides robust performance.

Figure 22:
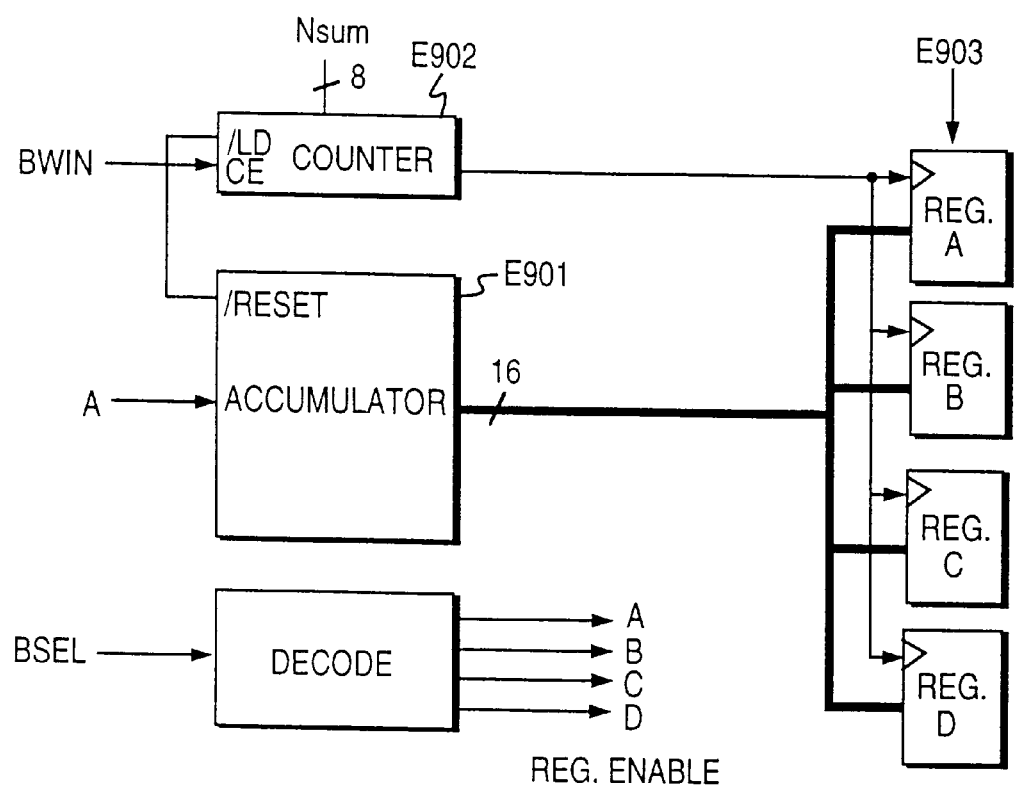
FIG. 22 is a simplified logic block diagram of a servo burst accumulator in accordance with the present invention for use in conjunction with the discrete time area detection circuit.

With reference additionally now to FIG. 22, another effect which causes variation of the servo burst amplitude measurement with sampling phase is the alignment of the accumulation window with the servo burst signal. If the accumulation does not include exactly an integer number of pulses (that is, half-cycles), then the measurement will change depending on the exact alignment or phase. This problem may be mitigated by triggering the beginning of accumulation by the signal "BWIN" after the servo burst signal has had time to reach steady state and appear sinusoidal. Then, the servo burst amplitude circuit accumulates for a predetermined period of time which is very close to an integer number of servo pulse periods.

Referring now to FIG. 22, the digital area detect circuit accumulates rectified samples in accumulator E901 immediately after the signal "BWIN" is made active. Also, counter E902 begins counting accumulation clocks at this time, starting at zero. Then, accumulation continues until the counter E902 reaches a programmed count number. At this time, the resulting accumulation is stored in one of the registers E903, depending on the value of the signal "BSEL". This process repeats until all servo bursts in the present field are measured. The servo burst amplitude measurements may then be read by the servo controller E162 (shown in FIG. 14) from the registers E903. This may be accomplished with a parallel or serial digital interface (not shown).

Many changes in form and detail could be made to the present invention after without departing from the essential function; the particular embodiments disclosed herein are not intended to be limiting. The scope of the invention is properly construed from the following claims.

TABLE 1

| Channel | Transfer Function | Dipulse Response |
|---|---|---|
| PR4 | (1 − D) (1 + D) | 0, 1, 0, −1, 0, 0, 0, . . . |
| EPR4 | (1 − D) (1 + D)$^2$ | 0, 1, 1, −1, −1, 0, 0, . . . |
| EEPR4 | (1 − D) (1 + D)$^3$ | 0, 1, 2, 0, −2, −1, 0, . . . |

TABLE B2

| Sample Value | Slicer Output |
|---|---|
| y >= T1 | +1 |
| −T2 <= y < T1 | 0 |
| y < −T2 | −1 |

TABLE C2

| State | Y(n − 1) | Y(n) | C0, C1 |
|---|---|---|---|
| +A, −A | +y | +y | 00 |
| −A, −A | +y | −y | 01 |
| −A, +A | −y | −y | 10 |
| +A, +A | −y | +y | 11 |

We claim:

1. A sampled amplitude read channel for reading data from a magnetic medium by detecting digital data from a sequence of discrete time sample values generated by sampling pulses in an analog read signal from a magnetic read head positioned over the magnetic medium, the digital data comprising user data and embedded servo data, the sampled amplitude read channel transitions between a user data and servo data mode, the sampled amplitude read channel comprising:

(a) a multiplexer connected to receive the analog read signal and at least one auxiliary analog signal generated by a servo controller for positioning the read head over the magnetic medium, the multiplexer having an analog output signal; and (b) a sampling device for sampling the analog output signal of the multiplexer wherein:

(a) the sampling device samples the analog read signal to generate the sequence of discrete time sample values when detecting the digital data recorded on the magnetic medium; and (b) the sampling device samples the at least one auxiliary analog signal to generate discrete time data related to the operation of the servo controller.

2. The sampled amplitude read channel as recited in claim 1, wherein the at least one auxiliary signal comprises an analog signal generated by a voice coil motor in the servo controller.

3. A sampled amplitude read channel for reading data recorded on a disk storage medium by detecting data from a sequence of discrete time sample values generated by sampling pulses in an analog read signal from a read head positioned over the disk storage medium, comprising:

(a) a sampling device connected to receive an analog input signal, for sampling the analog input signal to generate a sequence of channel sample values;

(b) a means for selecting between the analog read signal and an auxiliary analog signal as the analog input signal to the sampling device;

(c) a discrete time equalizer for equalizing the channel sample values of the analog read signal according to a partial response to generate equalized sample values; and (d) a discrete time sequence detector, responsive to the equalized sample values, for detecting the data recorded on the disk storage medium.

4. The sampled amplitude read channel as recited in claim 3, wherein the auxiliary analog signal is generated by a servo control system.

5. The sampled amplitude read channel as recited in claim 4, wherein the auxiliary analog signal represents the driving current of a voice coil motor in the servo control system.

6. A sampled amplitude read channel for reading data recorded on a disk storage medium by detecting data from a sequence of discrete time sample values generated by sampling pulses in an analog read signal from a read head positioned over the disk storage medium, comprising:

(a) a sampling device connected to receive an analog input signal, for sampling the analog input signal to generate a sequence of channel sample values;

(b) a means for selecting between the analog read signal and an auxiliary analog signal as the analog input signal to the sampling device;

(c) a timing recovery circuit, responsive to the channel sample values of the analog read signal, for generating a sequence of synchronous sample values substantially synchronized to a baud rate of the data recorded on the disk storage medium; and (d) a discrete time sequence detector, responsive to the synchronous sample values, for detecting the data recorded on the disk storage medium.

7. The sampled amplitude read channel as recited in claim 6, wherein the auxiliary analog signal is generated by a servo control system used to position the read head over the disk storage medium.

8. The sampled amplitude read channel as recited in claim 7, wherein the auxiliary analog signal represents the driving current of a voice coil motor in the servo control system.

* * * * *